US012794641B2

(12) United States Patent
Nory et al.

(10) Patent No.: US 12,794,641 B2
(45) Date of Patent: Nov. 10, 2026

(54) PHYSICAL DOWNLINK CONTROL CHANNEL MONITORING FOR ENHANCED CROSS CARRIER SCHEDULING

(71) Applicant: Telefonaktiebolaget LM Ericsson (publ), Stockholm (SE)

(72) Inventors: Ravikiran Nory, San José, CA (US); Ajit Nimbalker, Dublin, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 313 days.

(21) Appl. No.: 18/574,375

(22) PCT Filed: Aug. 4, 2022

(86) PCT No.: PCT/IB2022/057280

§ 371 (c)(1),
(2) Date: Dec. 27, 2023

(87) PCT Pub. No.: WO2023/012731

PCT Pub. Date: Feb. 9, 2023

(65) Prior Publication Data

US 2024/0372678 A1 Nov. 7, 2024

Related U.S. Application Data

(60) Provisional application No. 63/229,939, filed on Aug. 5, 2021.

(51) Int. Cl.
*H04L 5/00* (2006.01)
*H04W 72/231* (2023.01)

(52) U.S. Cl.
CPC ......... *H04L 5/0053* (2013.01); *H04W 72/231* (2023.01)

(58) Field of Classification Search
CPC .......................... H04L 5/0053; H04W 72/231
(Continued)

(56) References Cited

U.S. PATENT DOCUMENTS

2012/0207107 A1 8/2012 Li et al.
2013/0215875 A1 8/2013 Yang et al.
(Continued)

FOREIGN PATENT DOCUMENTS

CA 3110929 A1 3/2020
CN 104937865 A 9/2015
(Continued)

OTHER PUBLICATIONS

International Search Report and Written Opinion of the International Searching Authority, PCT/EP2021/079489, mailed Feb. 3, 2022, 12 pages.
(Continued)

*Primary Examiner* — Christopher R Crompton
(74) *Attorney, Agent, or Firm* — Sage Patent Group

(57) ABSTRACT

A communication device can monitor a physical downlink control channel ("PDCCH") for enhanced cross carrier scheduling. The device can receive a radio resource control ("RRC") layer message configuring cross carrier scheduling from a first serving cell configured for the device to a second serving cell. The device can further monitor, while the first serving cell is activated, a first number of PDCCH monitoring candidates on slots of the first serving cell for downlink control information ("DO") formats with physical downlink shared channel ("PDSCH") resource assignments and/or physical uplink shared channel ("PUSCH") grants for the second serving cell. Responsive to receiving a command, the device can cease to monitor the first number of PDCCH monitoring candidates and monitor a second number of PDCCH monitoring candidates on slots of the second serv-
(Continued)

ing cell for DCI formats with PDSCH resource assignments and/or PUSCH grants for the second serving cell.

24 Claims, 14 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2013/0315135 | A1 | 11/2013 | Lee et al. |
| 2014/0016593 | A1 | 1/2014 | Park et al. |
| 2016/0374082 | A1 | 12/2016 | Nguyen et al. |
| 2018/0152954 | A1 | 5/2018 | Golitschek Edler Von Elbwart et al. |
| 2018/0343102 | A1 | 11/2018 | Sebire et al. |
| 2019/0357238 | A1* | 11/2019 | Zhou ..................... H04W 72/23 |
| 2020/0163114 | A1 | 5/2020 | Chen Larsson et al. |
| 2020/0305134 | A1 | 9/2020 | Noh et al. |
| 2020/0313834 | A1 | 10/2020 | He |
| 2021/0168774 | A1* | 6/2021 | Li ......................... H04W 16/14 |
| 2021/0250920 | A1 | 8/2021 | Kim et al. |
| 2021/0329677 | A1 | 10/2021 | Huang |
| 2021/0352696 | A1 | 11/2021 | Yoshimura et al. |
| 2022/0294578 | A1 | 9/2022 | Kim et al. |
| 2022/0408458 | A1* | 12/2022 | MolavianJazi ....... H04L 5/0044 |
| 2022/0408465 | A1 | 12/2022 | Ji et al. |
| 2023/0026760 | A1 | 1/2023 | Takeda et al. |
| 2023/0036466 | A1 | 2/2023 | Yoshioka et al. |
| 2023/0047144 | A1 | 2/2023 | Gao et al. |
| 2023/0055673 | A1 | 2/2023 | Takeda et al. |
| 2023/0070761 | A1 | 3/2023 | Kim et al. |
| 2023/0084554 | A1 | 3/2023 | Shi et al. |
| 2023/0085345 | A1 | 3/2023 | Li et al. |
| 2023/0096674 | A1 | 3/2023 | Fu et al. |
| 2023/0164771 | A1 | 5/2023 | Liu et al. |
| 2023/0217452 | A1 | 7/2023 | Kim et al. |
| 2023/0247501 | A1 | 8/2023 | Kim et al. |
| 2023/0254857 | A1 | 8/2023 | Moon et al. |
| 2023/0284205 | A1 | 9/2023 | Nory et al. |

FOREIGN PATENT DOCUMENTS

| | | | |
|---|---|---|---|
| CN | 107005392 | A | 8/2017 |
| CN | 107624264 | A | 1/2018 |
| CN | 110475356 | A | 11/2019 |
| CN | 110830216 | A | 2/2020 |
| CN | 110876179 | A | 3/2020 |
| CN | 111132344 | A | 5/2020 |
| CN | 111132359 | A | 5/2020 |
| CN | 113271185 | A | 8/2021 |
| CN | 113965299 | B | 4/2024 |
| EP | 3952158 | A1 | 2/2022 |
| JP | 2016-006980 | A | 1/2016 |
| JP | 2018-522452 | A | 8/2018 |
| WO | 2020029945 | A1 | 2/2020 |
| WO | 2021130940 | A1 | 7/2021 |
| WO | 2021155790 | A1 | 8/2021 |
| WO | 2021160011 | A1 | 8/2021 |
| WO | 2021172851 | A1 | 9/2021 |
| WO | 2021239040 | A1 | 12/2021 |
| WO | 2022017386 | A1 | 1/2022 |
| WO | 2022029312 | A1 | 2/2022 |
| WO | 2022029316 | A1 | 2/2022 |
| WO | 2022029319 | A1 | 2/2022 |
| WO | 2022084552 | A1 | 4/2022 |
| WO | 2023012731 | A1 | 2/2023 |

OTHER PUBLICATIONS

Huawei et al., "NR CA enhancements and DSS," 3GPP TSG RAN Meeting #86, RP-192797, Sitges, Spain, Dec. 9-12, 2019, 2 pages.

Ericsson, "Enhanced cross-carrier scheduling for DSS," 3GPP TSG-RAN WG1 #102-e, R1-2006671, eMeeting, Aug. 17-28, 2020, 6 pages.

3GPP TS 38.213 V16.2.0 (Jun. 2020); 3rd Generation Partnership Project; Technical Specification Group Radio Access Network; NR; Physical layer procedures for control (Release 16); 176 pages.

Ericsson, "New WID on NR Dynamic spectrum sharing (DSS)", 3GPP TSG RAN Meeting #86, RP-193260, Sitges, Spain, Dec. 9-12, 2019, 4 pages.

NTT Docomo Inc., "Search space", 3GPP TSG RAN WG1 Meeting #93, R1-1807058, Busan, South Korea, May 21-25, 2018, 5 pages.

Intel Corporation, "Special SCell functionality in dual connectivity", 3GPP TSG RAN WG2 Meeting #85bis, R2-141202, Valencia, Spain, Mar. 31-Apr. 4, 2014, 3 pages.

Ericsson, "Dynamic spectrum sharing in Rel-17", 3GPP TSG RAN Meeting #84, RP-191052, Newport Beach, CA, USA, Jun. 3-6, 2019, 6 pages.

International Search Report and Written Opinion dated Nov. 24, 2021 for International Application No. PCT/EP2021/072064 filed Aug. 6, 2021, 15 pages.

International Search Report and Written Opinion dated Nov. 19, 2021 for International Application No. PCT/EP2021/072054 filed Aug. 6, 2021, 12 pages.

3GPP TSG RAN WG1 Meeting #59 R1-094830, "PDCCH Design for Cross-Carrier Operation Using CIF," Motorola; Agenda Item: 7.2.1.1; Jeju, Korea, Nov. 9-13, 2009, 3 pages.

3GPP TSG RAN WG1 Meeting #86 RP-192967; Tille: Summary of Rel-17 email discussion on MR-DC enhancements; Source: Huawei; Agenda Item: 9.1.2; Document for: Discussion and Decision; Location and Date: Sitges, Spain, Dec. 9-12, 2019, consisting of 44 pages.

3GPP TSG-RAN Meeting #86 RP-192677, Summary of Rel-17 email discussion on NR dynamic spectrum sharing, Ericsson (moderator), Agenda Item: 9.1.1, Sitges, Spain, Dec. 9-12, 2019, 5 pages.

Taiwan Office Action and English Summary dated Apr. 25, 2022, for Application No. 110129137, 19 pages.

International Search Report and Written Opinion of the International Searching Authority, PCT/EP2021/072070, mailed Nov. 17, 2021, 15 pages.

Australian Office Action dated Jan. 19, 2024, for Application No. 2021322743, 6 pages.

Japanese First Office Action dated May 20, 2024, for Application No. 2023-524789, 7 pages.

ZTE, "Discussion on Cross-Carrier Scheduling from SCell to Pcell", 3GPP TSG RAN WG1 Meeting #102-e, R1-2005440, e-Meeting, Aug. 17-28, 2020, 5 pages.

International Search Report and Written Opinion of the International Searching Authority, PCT/IB2022/057280, mailed Nov. 2, 2022, 10 pages.

3GPP TS 38.211 V16.6.0 (Jun. 2021); 3rd Generation Partnership Project; Technical Specification Group Radio Access Network; NR; Physical channels and modulation (Release 16), 134 pages.

Li Zeng, "Research and Realization of Physical Downlink Control Channel in LTE-A System" S130101003, Master's 1 Thesis English Translation, Jun. 8, 2016, 100 pages.

* cited by examiner

PHYSICAL DOWNLINK CONTROL CHANNEL MONITORING FOR ENHANCED CROSS CARRIER SCHEDULING

CROSS REFERENCE TO RELATED APPLICATIONS

This application is a 35 U.S.C. § 371 national stage application of PCT International Application No. PCT/IB2022/057280 filed on Aug. 4, 2022, which in turn claims domestic priority to U.S. Provisional Patent Application No. 63/229,939, filed on Aug. 5, 2021, the disclosures and content of which are incorporated by reference herein in their entirety.

TECHNICAL FIELD

The present disclosure is related to wireless communication systems and more particularly to cross-carrier scheduling.

BACKGROUND

FIG. 1 illustrates an example of a new radio ("NR") network (e.g., a 5th Generation ("5G") network) including a 5G core ("5GC") network 130, network node 120 (e.g., 5G base station ("gNB")), and a communication device 110 (also referred to as user equipment ("UE")).

Carrier aggregation ("CA") can be used in NR and LTE systems to improve UE transmit receive data rate. With CA, the UE can operate initially on a single serving cell called a primary cell ("PCell"). The PCell can be operated on a component carrier ("CC") in a frequency band. The UE can then be configured by the network with one or more secondary serving cells ("SCells"). Each SCell can correspond to a CC in the same frequency band (intra-band CA) or different frequency band (inter-band CA) from the frequency band of the CC corresponding to the PCell. For the UE to transmit/receive data on the SCells, for example, by receiving downlink shared channel ("DL-SCH") information on a physical downlink shared channel ("PDSCH") or by transmitting uplink shared channel ("UL-SCH") on a physical uplink shared channel ("PUSCH"), the SCells need to be activated by the network. The SCells can also be deactivated and later reactivated as needed via activation/deactivation signaling.

Dual connectivity ("DC") can be used in NR and LTE systems to improve UE transmit receive data rate. With DC, the UE can operate a master cell group ("MCG") and a secondary cell group ("SCG"). Each cell group can have one or more serving cells. The MCG cell, operating on the primary frequency, in which the UE either performs the initial connection establishment procedure or initiates the connection re-establishment procedure is referred to as the PCell. The SCG cell in which the UE performs random access when performing the Reconfiguration with Sync procedure is referred to as the primary SCG cell ("PSCell").

In some examples, the term "primary cell" or "primary serving cell" can refer to PCell for a UE not configured with DC, and can refer to PCell of MCG or PSCell of SCG for a UE configured with DC.

SUMMARY

According to some embodiments, a method performed by a communication device for monitoring a physical downlink control channel ("PDCCH") for enhanced cross carrier scheduling is provided. The method includes receiving a radio resource control ("RRC") layer message configuring cross carrier scheduling from a first serving cell configured for the communication device to a second serving cell. The method further includes, responsive to receiving the RRC layer message, monitoring, while the first serving cell is activated, a first number of PDCCH monitoring candidates on slots of the first serving cell for downlink control information ("DCI") formats with physical downlink shared channel ("PDSCH") resource assignments and/or physical uplink shared channel ("PUSCH") grants for the second serving cell. The method further includes, responsive to receiving a command, ceasing to monitor the first number of PDCCH monitoring candidates on slots of the first cell and monitoring a second number of PDCCH monitoring candidates on slots of the second serving cell for DCI formats with PDSCH resource assignments and/or PUSCH grants for the second serving cell.

According to other embodiments, a method performed by a network node operating in a communications network with a communication device monitoring a physical downlink control channel ("PDCCH") for enhanced cross carrier scheduling is provided. The method includes transmitting a radio resource control ("RRC") layer message configuring cross-carrier scheduling from a first serving cell configured for the communication device to a second serving cell. The method further includes, responsive to transmitting the RRC layer message, transmitting, while the first serving cell is activated, a first number of PDCCH monitoring candidates on slots of the first serving cell for downlink control information ("DCI") formats with physical downlink shared channel ("PDSCH") resource assignments and/or physical uplink shared channel ("PUSCH") grants for the second serving cell. The method further includes transmitting a command to the communication device, the command including an indication that the communication cease monitoring the PDCCH monitoring candidates on slots of the first cell. The method further includes transmitting a second number of PDCCH monitoring candidates on slots of the second serving cell for DCI formats with PDSCH resource assignments and/or PUSCH grants for the second serving cell.

According to other embodiments, a communication device, network node, computer program, computer program product, or non-transitory computer readable medium is provided to perform one of the methods above.

Certain embodiments may provide one or more of the following technical advantages including reduced additional PDCCH monitoring complexity for the UEs by limiting the number of PDCCH monitoring decoding candidates to monitor (considering the primary cell and sSCell together). The complexity reduction is achieved while retaining the flexibility to schedule PCell PDSCH/PUSCH from PCell and/or sSCell (depending on data traffic, sSCell availability etc.), and without the signaling overhead of frequent RRC reconfigurations.

In some embodiments, the desired PDCCH adaptation is achieved with minimal additional signaling overhead. In additional or alternative embodiments, an extra set of parameters is used in the linked SS set to allow configuration of number of PDCCH monitoring candidates more flexibility and efficiently (e.g. possible to individually change the number of candidates for each aggregation level by taking into account differences in bandwidth, center frequency, interference seen for the deployment etc. between the carriers of PCell and sSCell).

In additional or alternative embodiments, an extra SS set (or SS set groups) is used to allow configuration of PDCCH monitoring (e.g., number of PDCCH monitoring candidates, slots in which PDCCH is monitored, DCI formats to monitor) even more flexibility and efficiently, for example, by also taking into account duplex patterns for determining UL/DL slots of PCell and sSCell, and applicable MBSFN subframe configurations of an LTE cell operated on same carrier as PCell via DSS.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
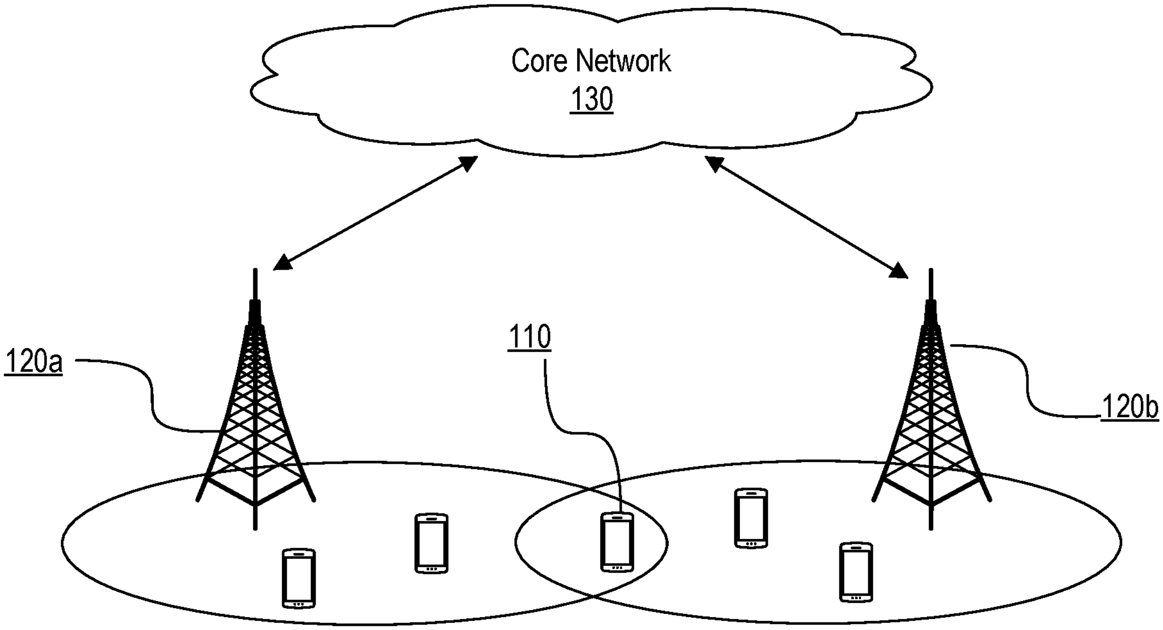
FIG. 1 is a schematic diagram illustrating an example of a $5^{th}$ generation (5G) network.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

In the $3^{rd}$ Generation Partnership Project ("3GPP") NR standard, downlink control information ("DCI") is received over the PDCCH. The PDCCH may carry DCI in messages with different formats. DCI format 0_0, 0_1, and 0_2 are DCI messages used to convey uplink grants to the UE for transmission of the physical layer data channel in the uplink ("PUSCH") and DCI format 1_0, 1_1, and 1_2 are used to convey downlink grants for transmission of the physical layer data channel in the downlink ("PDSCH"). Other DCI formats (2_0, 2_1, 2_2 and 2_3, etc) are used for other purposes such as transmission of slot format information, reserved resource, transmit power control information.

A UE typically monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

A PDCCH candidate can be searched within a common or UE-specific search space which is mapped to a set of time and frequency resources referred to as a control resource set ("CORESET"). The search spaces within which PDCCH candidates must be monitored are configured to the UE via radio resource control (RRC) signaling. A monitoring periodicity can also be configured for different PDCCH candidates. In any particular slot the UE may be configured to monitor multiple PDCCH candidates in multiple search spaces, which may be mapped to one or more CORESETs. PDCCH candidates may be monitored multiple times in a slot, once every slot, or once in multiple of slots.

The smallest unit used for defining CORESETs is a Resource Element Group ("REG"), which can be defined as spanning 1 physical resource block ("PRB")×1 orthogonal frequency division multiplexing ("OFDM") symbol in frequency and time. Each REG can include demodulation reference signals ("DM-RS") to aid in the estimation of the radio channel over which that REG was transmitted. When transmitting the PDCCH, a precoder can be used to apply weights at the transmit antennas e.g. based on some knowledge of the radio channel prior to transmission. It is possible to improve channel estimation performance at the UE by estimating the channel over multiple REGs that are proximate in time and frequency if the precoder used at the transmitter for the REGs is not different. To assist the UE with channel estimation the multiple REGs can be grouped together to form a REG bundle and the REG bundle size for a CORESET can be indicated to the UE. The UE may assume that any precoder used for the transmission of the PDCCH is the same for all the REGs in the REG bundle. A REG bundle may include 2, 3, or 6 REGs.

A control channel element ("CCE") can include 6 REGs. The REGs within a CCE may either be contiguous or distributed in frequency. When the REGs are distributed in frequency, the CORESET can be referred to as using an interleaved mapping of REGs to a CCE and if the REGs are not distributed in frequency, a non-interleaved mapping can be used.

A PDCCH candidate may span 1, 2, 4, 8, or 16 CCEs. The number of aggregated CCEs used is referred to as the aggregation level for the PDCCH candidate.

A hashing function can be used to determine the CCEs corresponding to PDCCH candidates that a UE must monitor within a search space set. The hashing can be done differently for different UEs so that the CCEs used by the UEs are randomized and the probability of collisions between multiple UEs for which PDCCH messages are included in a CORESET is reduced.

Blind decoding of potential PDCCH transmissions can be attempted by the UE in each of the configured PDCCH candidates within a slot. The complexity incurred at the UE to do this depends on number of blind decoding attempts and the number of CCEs which need to be processed.

In order to manage complexity, limits on the total number of CCEs and/or total number of blind decodes to be processed by the UE can be used for BD/CCE partitioning based on UE capability for NR operation with multiple component carriers.

For new radio ("NR") carrier aggregation ("CA"), cross-carrier scheduling ("CCS") can be specified using the following framework. First, a UE can have a primary serving cell ("PCell") and can be configured with one or more secondary serving cells ("SCells"). Second, for a given SCell with SCell index X, if the SCell is configured with a 'scheduling cell' with cell index Y (cross-carrier scheduling) the SCell X can be referred to as the 'scheduled cell;' the UE can monitor downlink (DL) physical downlink control channel ("PDCCH") on the scheduling cell Y for assignments/grants scheduling physical downlink shared channel (PDSCH)/physical uplink shared channel ("PUSCH") corresponding to SCell X; and the PDSCH/PUSCH corresponding to SCell X cannot be scheduled for the UE using a serving cell other than scheduling cell Y. Otherwise, the SCell X is the scheduling cell for SCell X (same-carrier scheduling); the UE can monitor DL PDCCH on SCell X for assignments/grants scheduling PDSCH/PUSCH corresponding to SCell X; and the PDSCH/PUSCH corresponding to SCell X cannot be scheduled for the UE using a serving cell other than SCell X. Third, a SCell cannot be configured as a scheduling cell for the primary cell. The primary cell is always its own scheduling cell.

Figure 2:
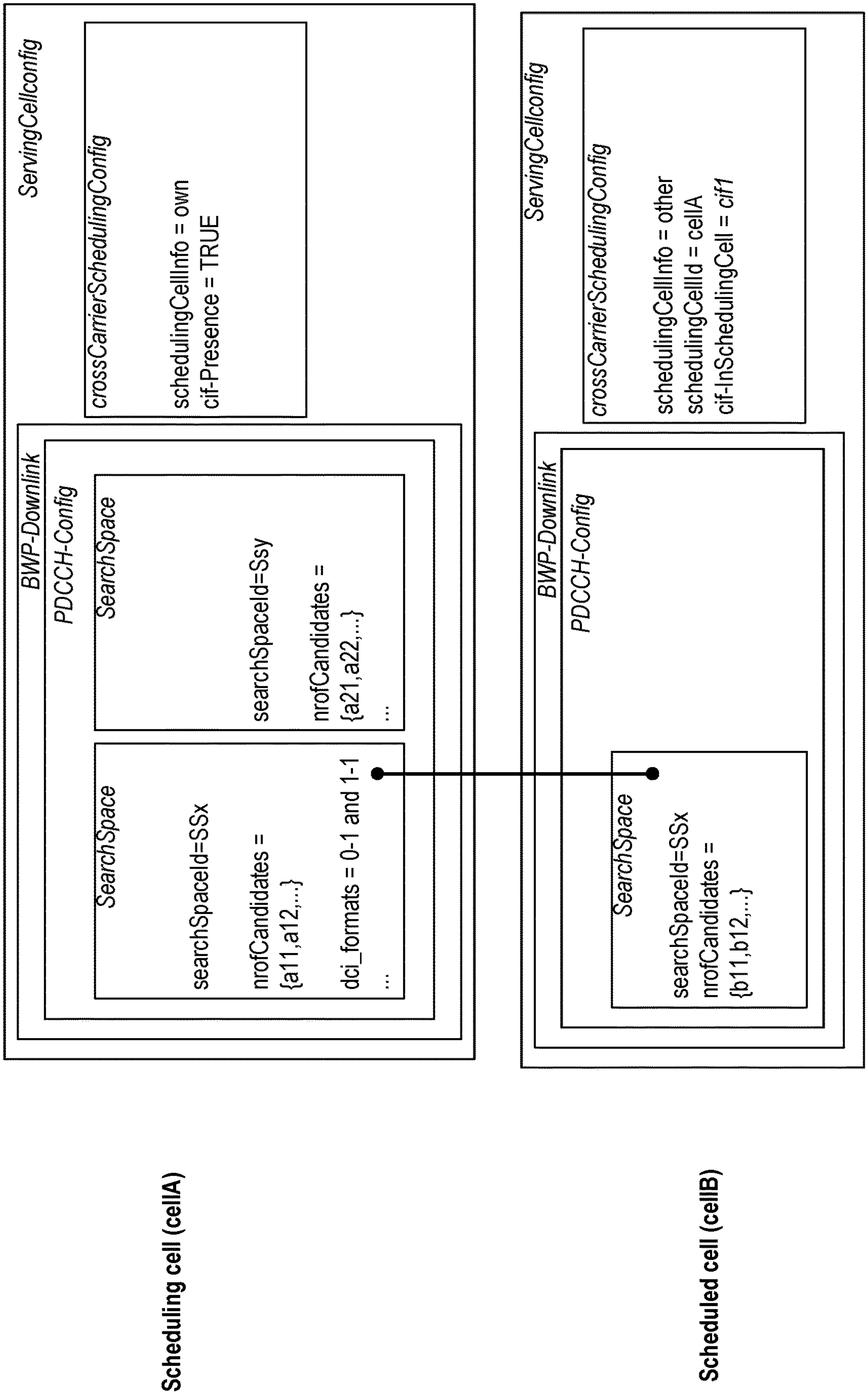
FIG. 2 is a block diagram illustrating an example of a search space handling with a current CCS framework.

If the UE is configured with cross-carrier scheduling with cell A as scheduling cell and cell B as scheduled cell, then PDCCH search space sets ("SS") are handled as shown in FIG. 2.

For scheduled cell B, as part of CCS configuration, the UE is configured with a parameter schedulingCellInfo set to value 'other,' a parameter schedulingCellId, indicating cell index of the scheduling cell (e.g., cell index of cell A), and a parameter cif-InSchedulingCell (e.g., the carrier indicator field ("CIF") value (e.g. cif1) to be indicated in PDCCH DCI of cell A when PDSCH/PUSCH of cell B has to be scheduled).

For scheduled cell B, as part of SS configuration, the UE is configured one or more SS sets each with a SS index (e.g., SSx) and a corresponding number of PDCCH monitoring candidates (e.g., b11 candidates for aggregation level L=1, b12 for L=2, . . . ) as part of cell B configuration.

For scheduling cell A, as part of CCS configuration, the UE is configured with a parameter schedulingCellInfo set to value 'own' and a parameter cif-Presence set to TRUE indicating presence of CIF field in PDCCH DCI.

For scheduling cell A, as part of SS configuration, the UE is configured with at least one SS set with same SS index as that configured for the scheduled cell (e.g., SSx). The UE may be configured with a non-zero number of PDCCH candidates (e.g. all candidates for aggregation level L=1, a12 for L=2, . . . ) for SSx as part of cell A configuration. The UE is also configured for monitoring PDCCH on cell A using SSx. The UE monitors the b11, b12, . . . . PDCCH candidates with DCI format size determined according to cell B configuration and if it detects a PDCCH DCI with CIF=cif1, it determines that the corresponding DCI format is for a PDSCH/PUSCH on Cell B (cross-carrier scheduling). The UE is also configured for monitoring the a11, a12, . . . . PDCCH candidates with DCI format size determined according to cell A configuration and if it detects a PDCCH DCI with CIF=0, it determines that the corresponding DCI format is for a PDSCH/PUSCH on Cell A (same-carrier scheduling or self-scheduling). The UE is also configured, in case the UE is configured with multiple DL BWPs for the scheduling cell and/or scheduled cell, to apply the search space for the scheduled cell only if the DL BWPs in which the linked search spaces are configured in scheduling cell and scheduled cell are both active.

With Rel16 CCS mechanism, the search spaces in scheduled cell and scheduling cell are linked to each other by having same searchSpaceId (e.g., SSx above). Also, when CCS is configured there is no PDCCH monitoring on the scheduled cell, a SCell cannot be configured as a scheduling cell for the primary cell, and the primary cell is always its own scheduling cell.

Enhanced Cross-Carrier Scheduling is described below in regards to FIG. 3.

Figure 3:
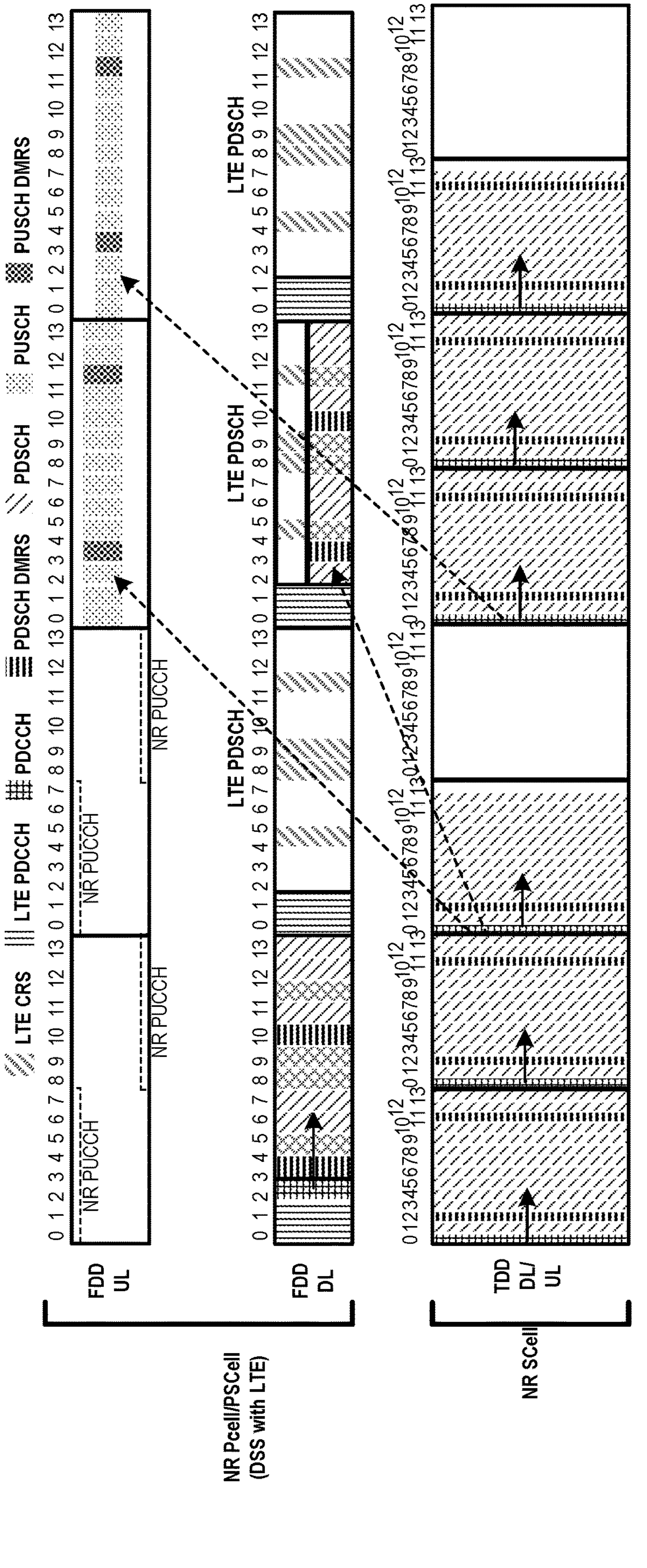
FIG. 3 illustrates an example of a carrier aggregation scenario for DSS.

FIG. 3 illustrates an example CA scenario used in deployments with dynamic spectrum sharing ("DSS") between LTE and NR. FIG. 3 illustrates slots for a NR PCell/PSCell (primary cell) for a DL CA capable UE operated on carrier where the same carrier is also used for serving LTE users via dynamic spectrum sharing, and slots for another NR SCell for configured for the same UE.

As shown in the FIG. 3, when a NR primary cell is operated on the same carrier on which legacy LTE users are served, the opportunities for transmitting PDCCH are significantly limited due to the need to avoid overlap with LTE transmissions (e.g. LTE PDCCH, LTE PDSCH, LTE CRS).

The example shown in FIG. 3 is for CA scenario for a DL CA capable UE with NR primary cell on FDD carriers with 15 kHz SCS and NR SCell on TDD carrier with 30 kHz SCS. The is just one of the expected scenarios. Other scenarios (e.g. SCell being operated on FDD band) with 15 kHz SCS are also possible.

For a UE supporting DL CA, providing the ability to use an SCell PDCCH to schedule primary cell PDSCH/PUSCH (e.g. as shown by dashed arrows in FIG. 3) helps in reducing the loading of primary cell PDCCH.

In NR Rel17, Enhanced cross-carrier scheduling (eCCS) to enable such cross-carrier scheduling from an SCell to PCell is being introduced. Such an SCell that supports cross-carrier scheduling to PCell can be referred to as 'special SCell' or 'SCell'.

There currently exist certain challenges. When UE is configured with a SCell (sSCell) that can schedule PDSCH/PUSCH on primary cell, the DCI formats corresponding to PCell PDSCH/PUSCH scheduling have to be monitored by the UE on both PCell and sSCell. Due to this, the PDCCH monitoring complexity (e.g., the hardware/software resources that need to be provisioned for decoding, channel estimation of PDCCH candidates) is potentially increased compared to the case of legacy scheduling. In legacy scheduling, the UEs are configured via RRC layer signaling such that, for DCI formats for a particular cell, PDCCH monitoring is configured on only one cell (generally referred to as the scheduling cell). Also, in legacy scheduling for the primary cell, only self-scheduling is allowed (i.e., the scheduling cell for PCell is the PCell itself).

The sub-carrier spacing (SCS) configuration) can be different for PDCCH monitoring on PCell and sSCell. i.e., PDCCH monitoring on PCell can be on PCell slots with SCS mu1 (e.g. 15 kHz SCS), and PDCCH monitoring on sSCell can be based on sSCell slots with SCS mu2 (e.g. 30 kHz SCS). The slot duration depends on the SCS configuration. For example, slots of 15 kHz SCS have twice the duration of slots of 30 kHz SCS.

Approaches for PDCCH monitoring that enable the SCell to PCell scheduling functionality with good trade-off between UE complexity and scheduling flexibility are required to handle the above cases.

Certain aspects of the disclosure and their embodiments may provide solutions to these or other challenges. When sSCell is activated for the UE (e.g. based on detection of SCell activation command in a MAC CE) or when the active BWP of the sSCell is set to a non-dormant BWP (i.e., a BWP on which UE performs PDCCH monitoring), UE monitors PDCCH candidates on sSCell for DCI formats that can schedule PDSCH/PUSCH on primary cell.

When sSCell is deactivated for the UE (e.g. based on detection of SCell deactivation command in a MAC CE) or when the active BWP of the sSCell is set to a dormant BWP (i.e., a BWP on which UE does not perform PDCCH monitoring), UE stops PDCCH monitoring on the sSCell and monitors some additional PDCCH candidates on the PCell (i.e., additional compared to the case when sSCell is activated) for DCI formats that can schedule PDSCH/PUSCH for the PCell.

The above adaptation can be achieved by efficient signaling and UE/gNB procedures for PDCCH monitoring that are discussed in this document.

For cross-carrier scheduling from SCell to PCell, adapting the PDCCH monitoring on PCell, and the PDCCH monitoring on sSCell (i.e., the SCell used for SCell to PCell cross-carrier scheduling) can be achieved via one or more of the following embodiments.

In a first embodiment, a number of PDCCH candidates to monitor on sSCell (for scheduling PCell PDSCH/PUSCH) is based on a set of parameters (e.g. 'nrofCandidates') configured in a linked SS set on PCell. When sSCell is deactivated or operating on dormant BWP, number of PDCCH candidates to monitor on PCell (for scheduling PCell PDSCH/PUSCH) is based on the same set of parameters configured in the linked SS set (e.g. 'nrofCandidates'), and by using a scaling factor (e.g., to account for SCS difference between PCell and sSCell).

In a second embodiment, a number of PDCCH candidates to monitor on sSCell (for scheduling PCell PDSCH/PUSCH) is based on a first set of parameters (e.g. 'nrofCandidates') configured in the linked SS set on PCell. When sSCell is deactivated or operating on dormant BWP, number of PDCCH candidates to monitor on PCell (for scheduling PCell PDSCH/PUSCH) is based on a second set of parameters (e.g. 'nrofCandidates2') configured in the same linked SS set.

In a third embodiment, a number of PDCCH candidates to monitor on sSCell (for scheduling PCell PDSCH/PUSCH) is based on parameters in a SS set on PCell (can be linked SS set). When sSCell is deactivated or operating on dormant BWP, the PDCCH monitoring on PCell (for scheduling PCell PDSCH/PUSCH) is adapted such that it is based on another specific SS set (or a SS set group) configured for the UE as part of PCell RRC configuration.

Certain embodiments may provide one or more of the following technical advantages including reduced additional PDCCH monitoring complexity for the UEs by limiting the number of PDCCH monitoring decoding candidates to monitor (considering the primary cell and sSCell together). The complexity reduction is achieved while retaining the flexibility to schedule PCell PDSCH/PUSCH from PCell and/or sSCell (depending on data traffic, sSCell availability etc.), and without the signaling overhead of frequent RRC reconfigurations.

In some embodiments (e.g., the first embodiment above), the desired PDCCH adaptation is achieved with minimal additional signaling overhead.

In additional or alternative embodiments (e.g., the second embodiments above), an extra set of parameters is used in the linked SS set to allow configuration of number of PDCCH monitoring candidates more flexibility and efficiently (e.g. possible to individually change the number of candidates for each aggregation level by taking into account differences in bandwidth, center frequency, interference seen for the deployment etc. between the carriers of PCell and sSCell).

In additional or alternative embodiments (e.g., the third embodiment above) an extra SS set (or SS set groups) is used to allow configuration of PDCCH monitoring (e.g., number of PDCCH monitoring candidates, slots in which PDCCH is monitored, DCI formats to monitor) even more flexibility and efficiently, for example, by also taking into account duplex patterns for determining UL/DL slots of PCell and sSCell, and applicable MBSFN subframe configurations of an LTE cell operated on same carrier as PCell via DSS.

A UE supporting carrier aggregation (CA) operates using a primary cell (PCell) and one or more secondary serving cells (SCells). The UE is configured (e.g., using a radio resource control (RRC) layer cross-carrier scheduling configuration) such that physical downlink control channel (PDCCH) on at least one of the SCells can be used for scheduling physical downlink shared channel (PDSCH)/physical uplink shared channel (PUSCH) for the primary cell. Such an SCell can be referred to as 'special SCell' or 'sSCell'.

Approaches for PDCCH monitoring that enable SCell to PCell scheduling functionality (i.e., via sSCell) with good trade-off between UE complexity and gNB scheduling flexibility, for example, with reduced additional PDCCH monitoring complexity for the UEs while providing the flexibility to schedule PCell from either PCell or sSCell are described below.

In some embodiments (sometimes referred to herein as a first embodiment), the existing cross-carrier scheduling can be enhanced such that monitoring of some PDCCH candidates that can schedule PCell PDSCH/PUSCH is switched between sSCell and PCell (potentially with different SCS than sSCell) based on whether the sSCell is activated (or operating using a non-dormant bandwidth part (BWP)) or not. Some details related to this are described below.

The UE is configured with a first search space (SS) set as part of a RRC configuration for the sSCell for the UE. The UE is expected to monitor PDCCH candidates on the sSCell for DCI formats that can schedule PDSCH/PUSCH for the PCell, based on one or more parameters (set 1) of the first SS set.

The UE is configured with a second SS set, where the second SS set is configured as part of RRC configuration for the PCell for the UE.

The first and second SS sets may be configured with the same search space identity/index value. By having the same identity/index value, the first and second SS sets can be considered as linked SS sets or can be considered as SS sets that are used for linking the cross-carrier scheduling from sSCell to PCell. Alternately, the first and second SS sets may be linked via some other RRC parameter.

As part of RRC configuration of the second SS set, the UE is configured with a first set of parameters (set 2_1). The first set of parameters can include parameters indicating number of PDCCH candidates to monitor. The number of PDCCH candidates to monitor can be separately configured for one or more values of PDCCH aggregation level L (L can be e.g. L=1, 2, 4, 8, 16). e.g. m1_1 candidates for aggregation level L=1, m1_2 for aggregation level L=2, . . . m1_16 for aggregation level L=16.

When sSCell is activated for the UE (e.g., based on detection of SCell activation command in a media access control (MAC) control element (CE)) or when the active BWP of the sSCell is set to a non-dormant BWP (e.g., a BWP on which UE performs PDCCH monitoring).

The UE monitors PDCCH candidates on the sSCell for DCI formats that can schedule PDSCH/PUSCH for the PCell, as follows.

The UE can determine the number of PDCCH candidates to monitor (e.g. on each sSCell slot) based on set 2_1 (i.e., the first set of parameters configured as part of RRC configuration of the second SS set). The UE can determine other PDCCH monitoring related parameters based on set 1 (i.e., the one or more parameters of the first SS set). The other parameters can include a Control Resource Set Identifier (CORESET ID) that indicates the Control resource set based on which the UE typically determines a set of PRBs, quasi-colocation information for spatial filtering, to monitor PDCCH candidates on the sSCell, parameters indicating Periodicity, Offset and duration based on which the UE typically determines the slots of sSCell to monitor PDCCH candidates on the sSCell.

Alternately, if the linked SS set approach is not used, the UE may determine number of PDCCH candidates to monitor for DCI formats that can schedule PDSCH/PUSCH for the PCell, and also other PDCCH monitoring related parameters based on parameters configured as part of the first SS set. In this case, separate parameters indicating the 'number of PDCCH candidates to monitor for DCI formats that can schedule PDSCH/PUSCH for the PCell', and 'number of PDCCH candidates to monitor for DCI formats that can schedule PDSCH/PUSCH for the sSCell' may be provided as part of configuration of the first SS set.

When sSCell is deactivated for the UE (e.g. based on detection of SCell deactivation command in a MAC CE) or when the active BWP of the sSCell is set to a dormant BWP (i.e., a BWP on which UE does not perform PDCCH monitoring).

The UE stops monitoring PDCCH candidates on the sSCell.

The UE monitors some additional PDCCH candidates on the PCell (e.g., additional compared to the case when sSCell is activated) for DCI formats that can schedule PDSCH/PUSCH for the PCell based on parameters configured for the second SS set. The parameters configured for the second SS set can indicate a number of PDCCH candidates to monitor, a control resource set identifier (CORESET ID), and parameters indicating periodicity, offset and duration.

The number of PDCCH candidates to monitor can be derived from the same first set of parameters (set 2_1) that are part of RRC configuration of the second SS set. If different SCS configuration is used for PDCCH monitoring on PCell and sSCell, the UE may determine the number of PDCCH candidates to monitor on PCell slots by applying a scaling factor (alpha) to the values indicated by the first set parameters (set 2_1). The scaling factor alpha can be based on SCS configuration (mu1) for PCell PDCCH monitoring and/or the SCS configuration (mu2) for sSCell PDCCH monitoring. For example, the scaling factor can be 2^(mu2−mu1). For example, if the sSCell has 30 KHz SCS configuration, mu2=1; and PCell has 15 kHz SCS configuration, mu1=0, then the scaling factor is 2.

For example, if set 2_1 indicates m1_L candidates for aggregation level L, the UE may determine the number of PDCCH candidates to monitor on PCell slot by using the formula floor (m1_L*2^(mu2−mu1)), where the floor( ) is the common mathematical floor function.

The CORESET ID indicates the Control resource set based on which the UE typically determines a set of physical resource blocks (PRBs), quasi-colocation information for spatial filtering, etc. to monitor PDCCH candidates on the PCell.

The parameters indicating periodicity, offset, and duration can be based on which the UE typically determines the slots of PCell to monitor PDCCH candidates on the PCell.

When the sSCell is activated or when the active BWP of the sSCell is set to a non-dormant BWP, the UE is generally not expected to monitor PDCCH candidates based on parameters of second search space set on the PCell.

Regardless of sSCell being activated or not, the UE may monitor PDCCH candidates on the PCell for DCI formats that can schedule PDSCH/PUSCH for the PCell based parameters of some other SS sets configured as part of RRC configuration on the PCell (e.g. based on parameters of SS sets other than the second SS set). The other SS sets can be common search space sets with Type 0/0A/1/2/3 or other UE specific search space sets.

Figure 4A:
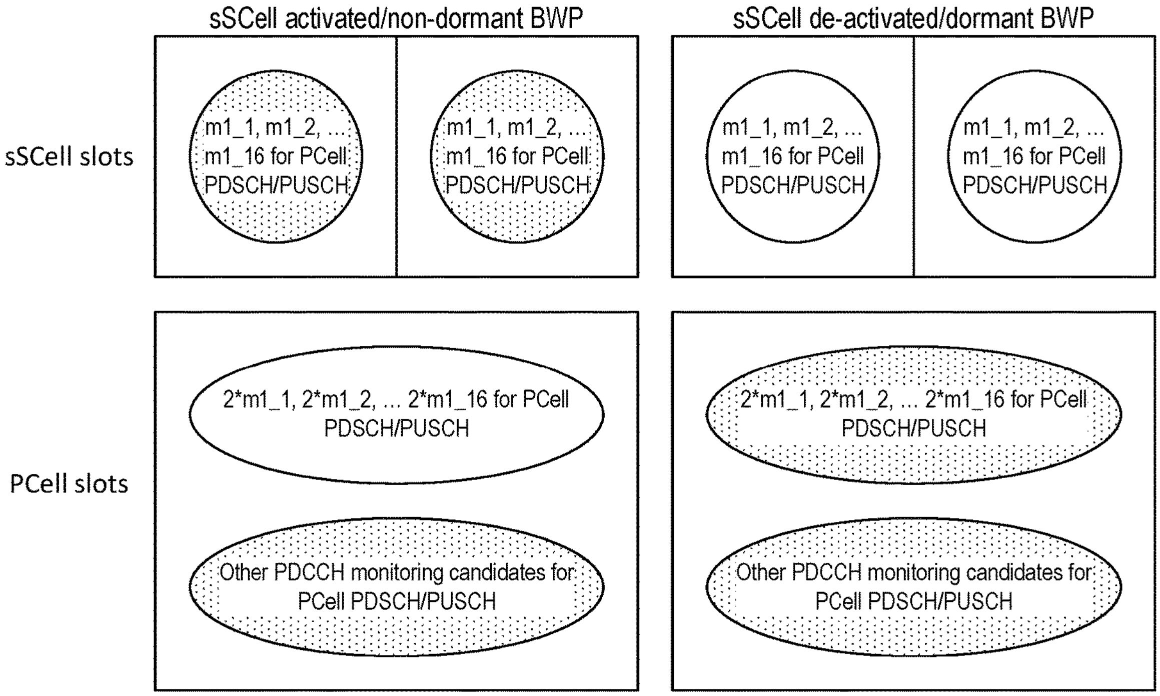
FIG. 4A illustrates an example of PDCCH monitoring for PCell slots and sSCell slots according to some embodiments of inventive concepts.

FIG. 4A illustrates an example of PDCCH monitoring for PCell slots and sSCell slots based on some aspects associated with the first embodiment described above.

Here it is assumed that sSCell SCS is twice that of PCell SCS (e.g., 15 kHz SCS for PCell and 30 kHz SCS for sSCell) due to which PCell slots span twice the duration of sSCell slots.

The shaded ovals in FIG. 4A imply that the number of PDCCH candidates mentioned within them are monitored in the corresponding slots for DCI formats that can schedule PDSCH/PUSCH for the PCell. Unshaded ovals imply that the number of PDCCH candidates mentioned within them are not monitored in the corresponding slots for DCI formats that can schedule PDSCH/PUSCH for the PCell.

As shown in FIG. 4A, when sSCell is activated or operated with non-dormant BWP, UE monitors m1_1, m1_2, . . . m1_16 PDCCH candidates (corresponding to PDCCH CCE aggregation levels L=1, 2, 4, 8, 16) on sSCell slots for DCI formats that can schedule PDSCH/PUSCH for the PCell.

When sSCell is deactivated or operated with dormant BWP, UE stops monitoring PDCCH on sSCell and instead monitors 2*m1_1, 2*m1_2, . . . 2*m1_16 PDCCH candidates (corresponding to PDCCH CCE aggregation levels L=1, 2, 4, 8, 16) on PCell slots for DCI formats that can schedule PDSCH/PUSCH for the PCell. Scaling factor alpha=2 is shown here as mu1=0 (corresponding to PCell SCS 15 kHz), mu2=1 (corresponding to sSCell SCS 30 kHz), and 2^(mu1−mu2)=2. The mapping between mu values and SCS spacing is according to definitions provided in current NR specs (TS 38.211-g60).

Figure 4B:
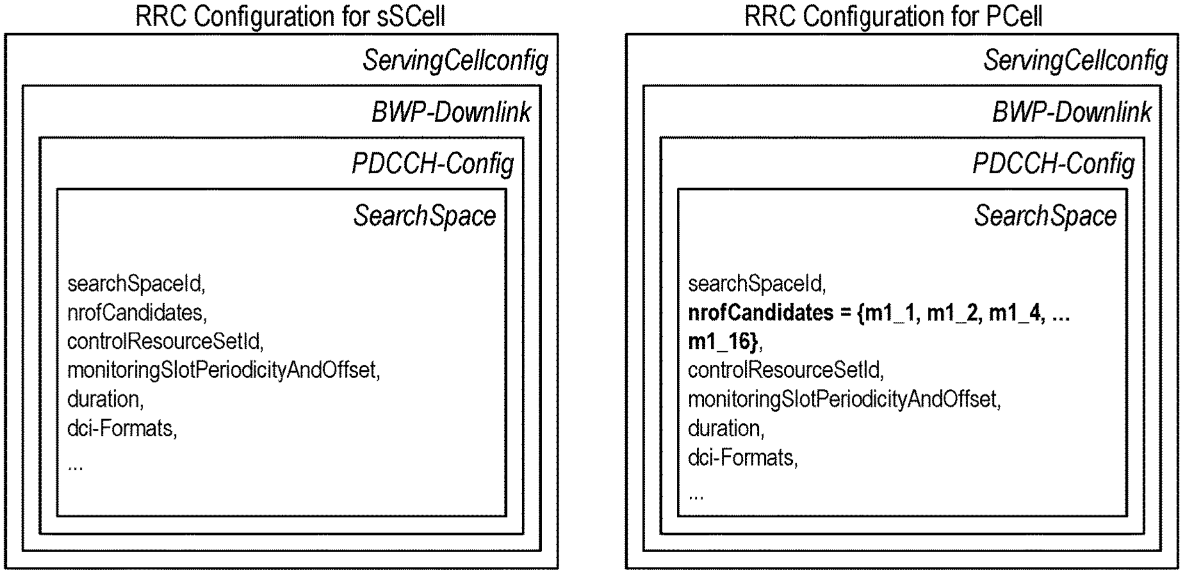
FIG. 4B illustrates an example RRC configuration PCell and sSCell corresponding to operations shown in FIG. 4A according to some embodiments of inventive concepts.

FIG. 4B illustrates an example RRC configuration PCell and sSCell corresponding to operation shown in FIG. 4A. As illustrated in FIG. 4B, the sSCell RRC configuration includes SearchSpace information element (IE) (corresponding to first SS set discussed above) providing information about CORESET ID, periodicity, duration, etc. for PDCCH monitoring on sSCell slots.

The PCell RRC configuration includes another SearchSpace IE (corresponding to second SS set discussed above) providing information on number of PDCCH monitoring candidates 'nrofCandidates' used for determining number of PDCCH monitoring candidates on sSCell slots for DCI formats that can schedule PDSCH/PUSCH for the PCell when sSCell is activated, and also used for determining number of PDCCH monitoring candidates on PCell slots for DCI formats that can schedule PDSCH/PUSCH for the PCell when sSCell is deactivated.

The SearchSpace IE for the PCell can also include other parameters providing information about CORESET ID, periodicity, duration, etc. for PDCCH monitoring on PCell slots for DCI formats that can schedule PDSCH/PUSCH for the PCell.

The SearchSpace IE for the sSCell can also include a parameter 'nrofCandidates' providing information on number of PDCCH monitoring candidates to monitor on sSCell slots for DCI formats that can schedule PDSCH/PUSCH for the sSCell.

In additional or alternative embodiments (sometimes referred to herein as the second embodiments), the existing cross-carrier scheduling can be enhanced by including an additional set of RRC parameters (set 2_2) as part of the RRC configuration of the linked SS set configured on the PCell. The additional set of RRC parameters can include parameters indicating number of PDCCH candidates to monitor on PCell based on the PCell's linked SS set when sSCell is deactivated. With this approach, the linked SS set on the PCell includes two sets of parameters that indicate number of PDCCH candidates to monitor. The first set (e.g., set 2_1 as discussed for Alt 1 above) is used for determining the number of PDCCH candidates to monitor on sSCell (for DCI formats scheduling PDCCH/PUSCH for PCell) using the linked SS set configured on the sSCell when sSCell is activated. When sSCell is deactivated, the monitoring on sSCell is PDCCH stopped and UE starts monitoring additional PDCCH candidates on the PCell using set 2_2. Some details related to this are described below.

The UE is configured with a first search space set (SS set) as part of a RRC configuration for the sSCell for the UE. The UE is expected to monitor PDCCH candidates on the sSCell for DCI formats that can schedule PDSCH/PUSCH for the PCell, based on one or more parameters (set 1) of the first SS set.

The UE is configured with a second SS set, where the second SS set is configured as part of RRC configuration for the PCell for the UE.

The first and second SS sets may be configured with the same search space identity/index value. By having the same identity/index value, the first and second SS sets can be considered as linked SS sets or can be considered as SS sets that are used for linking the cross-carrier scheduling from sSCell to PCell. Alternately, the first and second SS sets may be linked via some other RRC parameter.

As part of RRC configuration of the second SS set, the UE is configured with a first set of parameters (set 2_1). The first set of parameters can include parameters indicating number of PDCCH candidates to monitor. The number of PDCCH candidates to monitor can be separately configured for one or more values of PDCCH aggregation level L (L can be e.g. L=1, 2, 4, 8, 16). e.g. m1_1 candidates for aggregation level L=1, m1_2 for aggregation level L=2, . . . . The UE is also configured with an additional set of parameters (set 2_2). The additional set of parameters can include parameters indicating number of PDCCH candidates to monitor. For example, the additional set of parameters can indicate additional number of PDCCH candidates to monitor on the PCell when PDCCH monitoring is not performed on the sSCell. The number of PDCCH candidates to monitor can be separately configured for one or more values of PDCCH aggregation level L (L can be e.g. L=1, 2, 4, 8, 16). e.g. m2_1 candidates for aggregation level L=1, m2_2 for aggregation level L=2, . . . .

When sSCell is activated for the UE (e.g. based on detection of SCell activation command in a MAC CE) or when the active BWP of the sSCell is set to a non-dormant BWP (i.e., a BWP on which UE performs PDCCH monitoring), the UE monitors PDCCH candidates on the sSCell for DCI formats that can schedule PDSCH/PUSCH for the PCell, as described in regards to the first embodiment.

When sSCell is deactivated for the UE (e.g. based on detection of SCell deactivation command in a MAC CE) or when the active BWP of the sSCell is set to a dormant BWP (i.e., a BWP on which UE does not perform PDCCH monitoring), the UE stops monitoring PDCCH candidates on the sSCell and the UE monitors some additional PDCCH candidates on the PCell (e.g., additional compared to the case when sSCell is activated) for DCI formats that can schedule PDSCH/PUSCH for the PCell based on parameters configured for the second SS set.

The parameters configured for the second SS set can indicate, a number of PDCCH candidates to monitor on each PCell slot. This can be derived from the additional set of parameters (set 2_2) that are included as part of RRC configuration of the second SS set. The parameters configured for the second SS set can further indicate a Control Resource Set Identifier (CORESET ID) that indicates the Control resource set based on which the UE typically determines a set of PRBs, quasi-colocation information for spatial filtering, etc. to monitor PDCCH candidates on the PCell. The parameters configured for the second SS set can further indicate parameters indicating Periodicity, Offset and duration based on which the UE typically determines the slots of PCell to monitor PDCCH candidates on the PCell.

When the sSCell is activated or when the active BWP of the sSCell is set to a non-dormant BWP, in one variant of this alternative, the UE does not monitor PDCCH candidates on the PCell based on either the first set of parameters (set 2_1) or based on the additional set parameters (set 2_2) of the second search space set.

In additional or alternative embodiments, the UE may be configured with one more additional set of parameters (set 2_3) as part of RRC configuration of the second SS set. Similar to set 2_2, set 2_3 can include parameters indicating number of PDCCH candidates to monitor. For example, the one more additional set of parameters can indicate number of PDCCH candidates to monitor on the PCell when PDCCH monitoring is performed on the sSCell when the sSCell is activated or when the active BWP of the sSCell is a non-dormant BWP. The number of PDCCH candidates to monitor can be separately configured for one or more values of PDCCH aggregation level L (L can be e.g. L=1, 2, 4, 8, 16). e.g. m3_1 candidates for aggregation level L=1, m3_2 for aggregation level L=2, . . . .

For such cases, when the sSCell is activated or when the active BWP of the sSCell is set to a non-dormant BWP, the UE monitors PDCCH candidates on the PCell (for DCI formats that can schedule PDSCH/PUSCH for the PCell) based on set 2_3, and monitors PDCCH candidates on the sSCell (for DCI formats that can schedule PDSCH/PUSCH for the PCell) based on set 2_1. When sSCell is deactivated or when the active BWP of the sSCell is set to a dormant BWP, the UE stops PDCCH monitoring on the sSCell and monitors PDCCH candidates on the PCell (for DCI formats that can schedule PDSCH/PUSCH for the PCell) based on set 2_2. The number of PDCCH candidates monitored by the UE on PCell based on set 2_3 would be generally smaller than the number of PDCCH candidates monitored by the UE on PCell based on set 2_2.

Whether a UE supports such a variant can be indicated by the UE using UE capability signaling. For example, if the UE indicates a capability that it can monitor some PDCCH candidates on the PCell and on the sSCell in symbols/slots of PCell and sSCell that overlap in time, then such a UE (Type B UE) may also support this variant. Alternately if a UE does not support such simultaneous monitoring (Type A UE), such a UE may not monitor PDCCH candidates on the PCell based on either the first set of parameters (set 2_1) or based on the additional set parameters (set 2_2) of the second search space set when sSCell is activated or using a non-dormant BWP.

Figure 5A:
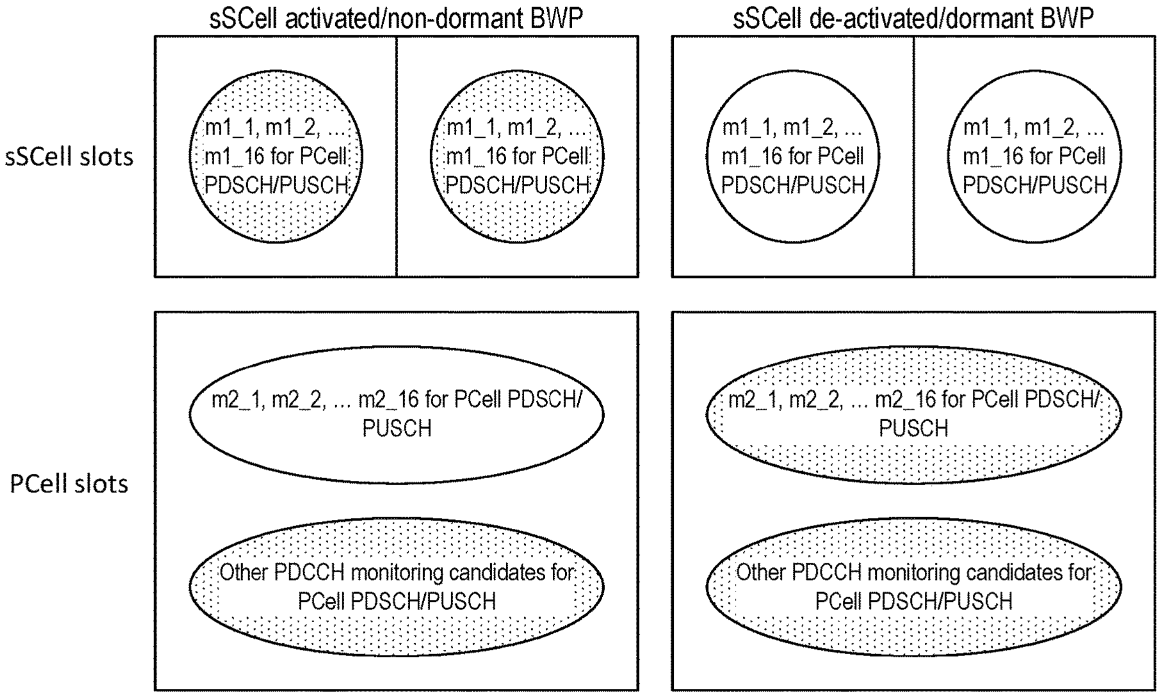
FIG. 5A illustrates an example of PDCCH monitoring for PCell slots and sSCell slots according to some embodiments of inventive concepts.

FIG. 5A illustrates an example of PDCCH monitoring for PCell slots and sSCell slots based on some aspects discussed above in regards to the second embodiment.

Similar to FIGS. 4A-B, in regards to FIG. 5A it is assumed that sSCell SCS is twice that of PCell SCS (e.g., 15 kHz SCS for PCell and 30 kHz SCS for sSCell). Shaded ovals imply that the number of PDCCH candidates mentioned within them are monitored in the corresponding slots for DCI formats that can schedule PDSCH/PUSCH for the PCell. Unshaded ovals imply that the number of PDCCH candidates mentioned within them are not monitored in the corresponding slots for DCI formats that can schedule PDSCH/PUSCH for the PCell.

As shown in FIG. 5A, when sSCell is activated or operated with non-dormant BWP, UE monitors m1_1, m1_2, . . . m1_16 PDCCH candidates (corresponding to PDCCH CCE aggregation levels L=1, 2, 4, 8, 16) on sSCell slots for DCI formats that can schedule PDSCH/PUSCH for the PCell.

When sSCell is deactivated or operated with dormant BWP, UE stops monitoring PDCCH on sSCell and instead monitors m2_1, m2_2, . . . m2_16 PDCCH candidates (corresponding to PDCCH CCE aggregation levels L=1, 2, 4, 8, 16) on PCell slots for DCI formats that can schedule PDSCH/PUSCH for the PCell. Scaling factor alpha as in Alt 1 is not needed as the NW can take the SCS and slot duration differences into account along with other factors (e.g. BW of the component carrier of PCell) when providing m2_1, m2_2, . . . m2_16 via RRC to the UE.

Figure 5B:
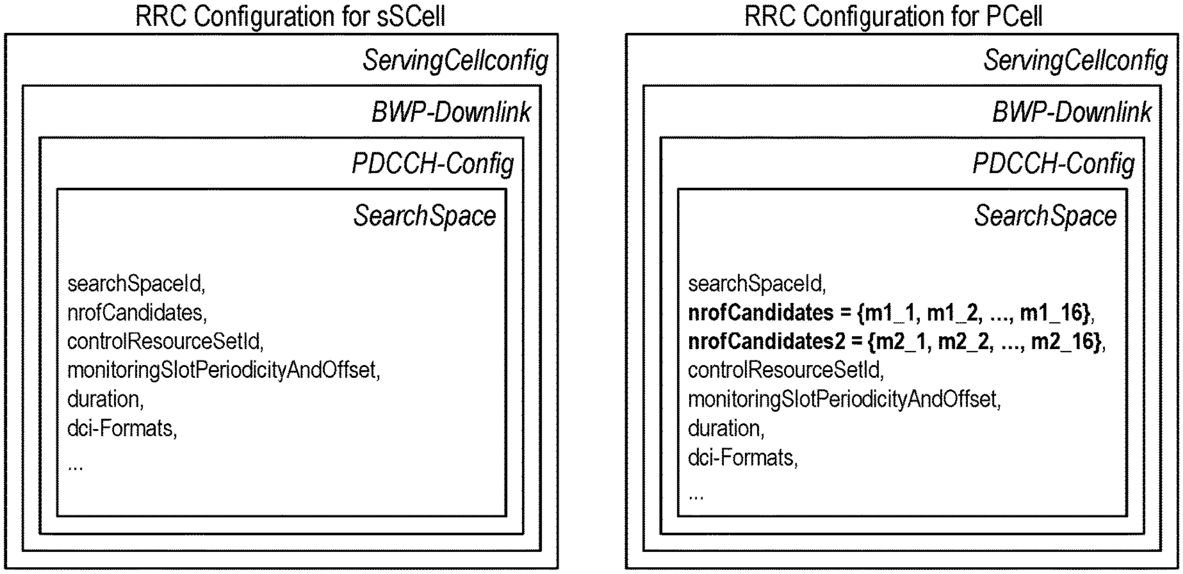
FIG. 5B illustrates an example RRC configuration PCell and sSCell corresponding to operations shown in FIG. 5A according to some embodiments of inventive concepts.

FIG. 5B illustrates an example RRC configuration PCell and sSCell corresponding to operation shown in FIG. 5A. As illustrated in FIG. 5B, the sSCell RRC configuration includes SearchSpace information element (IE) (corresponding to first SS set discussed above) providing information about CORESET ID, periodicity, duration, etc. for PDCCH monitoring on sSCell slots.

The PCell RRC configuration includes another SearchSpace IE (corresponding to second SS set discussed above). The IE provides information on number of PDCCH monitoring candidates 'nrofCandidates' used for determining number of PDCCH monitoring candidates on sSCell slots for DCI formats that can schedule PDSCH/PUSCH for the PCell when sSCell is activated. The IE also provides information on number of PDCCH monitoring candidates 'nrofCandidates2' used for determining number of PDCCH monitoring candidates on PCell slots for DCI formats that can schedule PDSCH/PUSCH for the PCell when sSCell is deactivated. This can require additional RRC overhead, i.e., extra set of parameters need to be signaled to the UE but in turn it lets the NW configure the PDCCH monitoring candidates more flexibly and efficiently.

The SearchSpace IE for the PCell can also include other parameters providing information about CORESET ID, periodicity, duration, etc. for PDCCH monitoring on PCell slots for DCI formats that can schedule PDSCH/PUSCH for the PCell.

The SearchSpace IE for the sSCell can also include a parameter 'nrofCandidates' providing information on number of PDCCH monitoring candidates to monitor on sSCell slots for DCI formats that can schedule PDSCH/PUSCH for the sSCell.

In additional or alternative embodiments (sometimes referred to herein as a third embodiment), the existing cross-carrier scheduling can be enhanced by including an additional SS set (third SS set) as part of a RRC configuration for the PCell for the UE. When the sSCell is deactivated, the UE stops monitoring PDCCH candidates on the sSCell, and starts monitoring additional PDCCH candidates based on parameters configured for the third SS set. Some details related to this are described below.

The UE is configured with a first search space set (SS set) as part of a RRC configuration for the sSCell for the UE. The UE is expected to monitor PDCCH candidates on the sSCell for DCI formats that can schedule PDSCH/PUSCH for the PCell, based on one or more parameters (set 1) of the first SS set.

The UE is configured with a second SS set, where the second SS set is configured as part of RRC configuration for the PCell for the UE.

The UE is also configured with an additional SS set (third SS set), where the additional SS set is configured as part of RRC configuration for the PCell for the UE.

The first and second SS sets may be configured with the same search space identity/index value. By having the same identity/index value, the first and second SS sets can be considered as linked SS sets or can be considered as SS sets that are used for linking the cross-carrier scheduling from sSCell to PCell. Alternately, the first and second SS sets may be linked via some other RRC parameter.

As part of RRC configuration of the second SS set, the UE is configured with a first set of parameters (set 2_1). The first set of parameters can include parameters indicating number of PDCCH candidates to monitor. The number of PDCCH candidates to monitor can be separately configured for one or more values of PDCCH aggregation level L (L can be e.g. L=1, 2, 4, 8, 16). e.g. m1_1 candidates for aggregation level L=1, m1_2 for aggregation level L=2, . . . .

As part of RRC configuration of the third SS set, the UE can be configured with parameters indicating a number of PDCCH candidates to monitor. The number of PDCCH candidates to monitor can be separately configured for one or more values of PDCCH aggregation level L (L can be e.g. L=1, 2, 4, 8, 16). e.g. m2_1 candidates for aggregation level L=1, m2_2 for aggregation level L=2, . . . . The UE can also be configured with parameters indicating a Search space index, Control Resource Set Identifier (CORESET ID) that indicates the Control resource set based on which the UE typically determines a set of PRBs, quasi-colocation information for spatial filtering, etc. to monitor PDCCH candidates on the PCell. the UE can also be configured with parameters indicating parameters indicating Periodicity, Offset and duration based on which the UE typically determines the slots of PCell to monitor PDCCH candidates on the PCell.

When sSCell is activated for the UE (e.g. based on detection of SCell activation command in a MAC CE) or when the active BWP of the sSCell is set to a non-dormant BWP (i.e., a BWP on which UE performs PDCCH monitoring), the UE monitors PDCCH candidates on the sSCell for DCI formats that can schedule PDSCH/PUSCH for the PCell as described in the first embodiment.

When sSCell is deactivated for the UE (e.g. based on detection of SCell deactivation command in a MAC CE) or when the active BWP of the sSCell is set to a dormant BWP (i.e., a BWP on which UE does not perform PDCCH monitoring), the UE stops monitoring PDCCH candidates on the sSCell and the UE monitors additional PDCCH candidates on the PCell (e.g., additional compared to the case when sSCell is activated) for DCI formats that can schedule PDSCH/PUSCH for the PCell based on parameters configured for the third SS set.

In some examples, the UE may be configured with a group of SS sets (search space set group or SSSG) that include a SS set similar to the third SS set discussed above. Then, when sSCell is deactivated for the UE (e.g. based on detection of SCell deactivation command in a MAC CE) or when the active BWP of the sSCell is set to a dormant BWP (i.e., a BWP on which UE does not perform PDCCH monitoring), the UE can monitor additional PDCCH candidates on the PCell (i.e., additional compared to the case when sSCell is activated) for DCI formats that can schedule PDSCH/PUSCH for the PCell based on parameters configured for the search space set group.

The network can indicate the UE via higher layer signaling (e.g. RRC) the specific search space index corresponding to the third search space set or the SSSG identifier corresponding to the SSSG that the UE can use for monitoring additional PDCCH candidates on the PCell (e.g., additional compared to the case when sSCell is activated) when sSCell is deactivated or when the active BWP of the sSCell is set to a dormant BWP.

When the sSCell is activated or when the active BWP of the sSCell is set to a non-dormant BWP, in one variant of this alternative, the UE does not monitor PDCCH candidates on the PCell based on the third SS set or a SSSG including the third SS set.

In additional or alternative embodiments, the UE may be configured with one more additional SS set (fourth SS set) as part of RRC configuration of the PCell. Similar to the third SS set, the UE can be configured with the following for the fourth SS set: parameters indicating number of PDCCH candidate to monitor; a CORESET ID; and parameters indicating periodicity, offset, and duration. The parameters indicating the number of PDCCH candidates to monitor can be separately configured for one or more values of PDCCH aggregation level L (L can be e.g. L=1, 2, 4, 8, 16). e.g. m3_1 candidates for aggregation level L=1, m3_2 for aggregation level L=2, . . . . The CORESET ID can indicate the Control resource set based on which the UE typically determines a set of PRBs, quasi-colocation information for spatial filtering, etc. to monitor PDCCH candidates on the PCell. The parameters indicating periodicity, offset, and duration can be based on the parameters the UE typically uses to determine the slots of PCell to monitor PDCCH candidates on the PCell.

In some examples, when the sSCell is activated or when the active BWP of the sSCell is set to a non-dormant BWP, the UE monitors PDCCH candidates on the PCell (for DCI formats that can schedule PDSCH/PUSCH for the PCell) based parameters configured for fourth SS set, and also monitors PDCCH candidates on the sSCell (for DCI formats that can schedule PDSCH/PUSCH for the PCell). When sSCell is deactivated or when the active BWP of the sSCell is set to a dormant BWP, the UE stops PDCCH monitoring on the sSCell and monitors PDCCH candidates on the PCell (for DCI formats that can schedule PDSCH/PUSCH for the PCell) based parameters configured for third SS set. The number of PDCCH candidates monitored by the UE on PCell based on fourth SS set would be generally smaller than the number of PDCCH candidates monitored by the UE on PCell based on third SS set.

Whether a UE supports such a variant can be indicated by the UE using UE capability signaling. For example, if the UE indicates a capability that it can monitor some PDCCH candidates on the PCell and on the sSCell in symbols/slots of PCell and sSCell that overlap in time, then such a UE (Type B UE) may also support this variant. Alternately, a UE that does not support such simultaneous monitoring (Type A UE), may not monitor PDCCH candidates on the PCell based on the third search space set when sSCell is activated or using a non-dormant BWP.

Figure 6A:
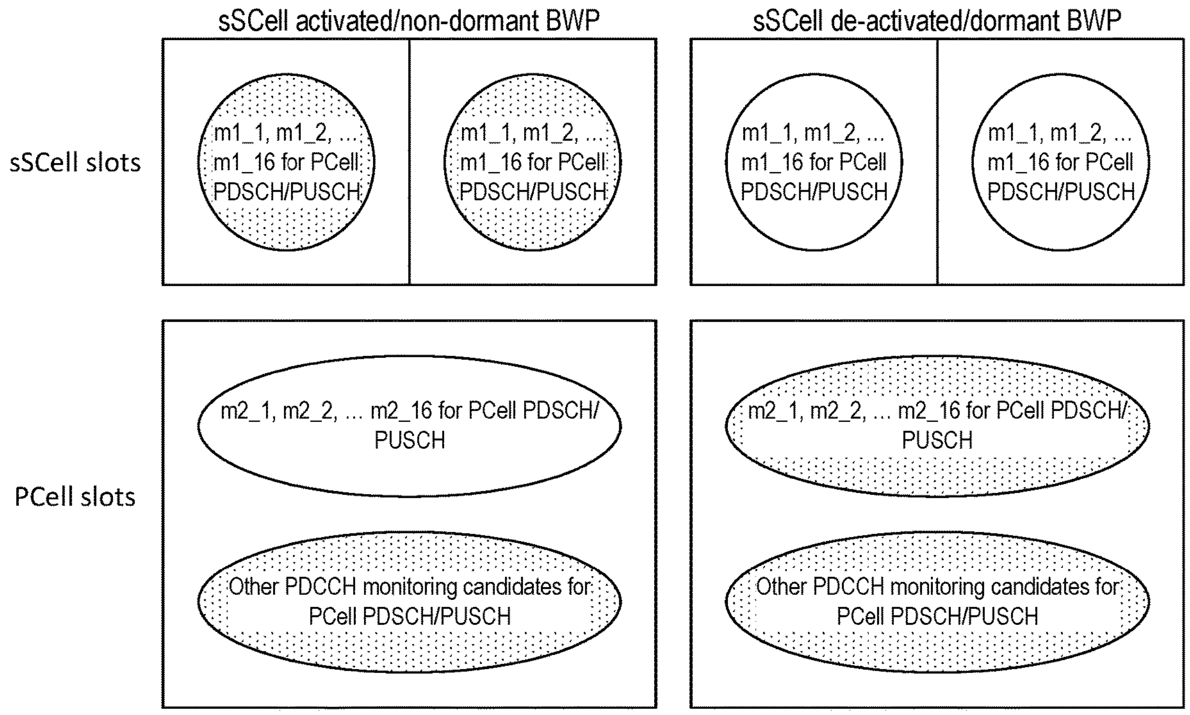
FIG. 6A illustrates an example of PDCCH monitoring for PCell slots and sSCell slots according to some embodiments of inventive concepts.

FIG. 6A illustrates an example of PDCCH monitoring for PCell slots and sSCell slots based on some aspects discussed above in regards to the third embodiment.

Similar to FIGS. 4A-B, it is assumed that sSCell SCS is twice that of PCell SCS (e.g., 15 kHz SCS for PCell and 30 kHz SCS for sSCell). Shaded ovals imply that the number of PDCCH candidates mentioned within them are monitored in the corresponding slots for DCI formats that can schedule PDSCH/PUSCH for the PCell. Unshaded ovals imply that the number of PDCCH candidates mentioned within them are not monitored in the corresponding slots for DCI formats that can schedule PDSCH/PUSCH for the PCell.

Figure 6B:
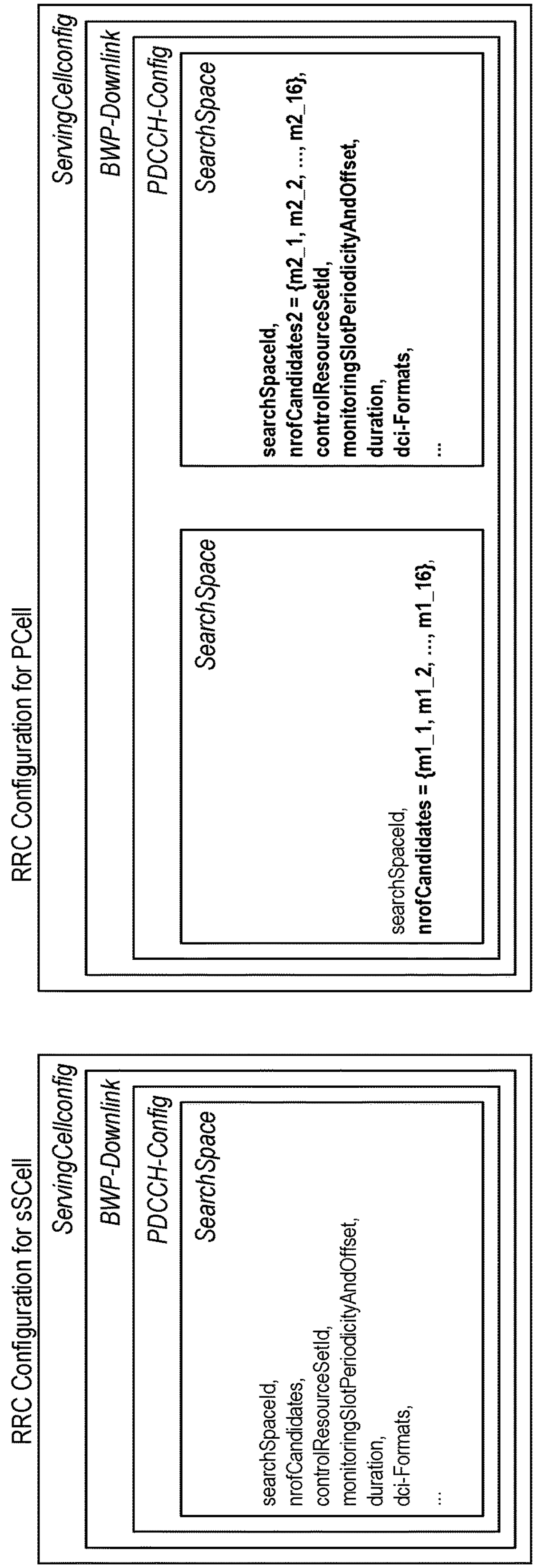
FIG. 6B illustrates an example RRC configuration PCell and sSCell corresponding to operations shown in FIG. 5A according to some embodiments of inventive concepts.

As shown in FIGS. 6A-B, when sSCell is activated or operated with non-dormant BWP, UE monitors m1_1, m1_2, . . . m1_16 PDCCH candidates (corresponding to PDCCH CCE aggregation levels L=1, 2, 4, 8, 16) on sSCell slots for DCI formats that can schedule PDSCH/PUSCH for the PCell.

When sSCell is deactivated or operated with dormant BWP, UE stops monitoring PDCCH on sSCell and instead monitors m2_1, m2_2, . . . m2_16 PDCCH candidates (corresponding to PDCCH CCE aggregation levels L=1, 2, 4, 8, 16) on PCell slots for DCI formats that can schedule PDSCH/PUSCH for the PCell. The m2_1, m2_2, . . . m2_16 PDCCH candidates are configured as part on a separate SS set for this alternative.

FIG. 6B illustrates an example RRC configuration PCell and sSCell corresponding to operation shown in FIG. 6A. As illustrated, the sSCell RRC configuration includes SearchSpace information element (IE) (corresponding to first SS set discussed above) providing information about CORESET ID, periodicity, duration, etc. for PDCCH monitoring on sSCell slots.

The PCell RRC configuration includes another SearchSpace IE (corresponding to second SS set discussed above). The IE provides information on number of PDCCH monitoring candidates 'nrofCandidates' used for determining number of PDCCH monitoring candidates on sSCell slots for DCI formats that can schedule PDSCH/PUSCH for the PCell when sSCell is activated.

The PCell RRC configuration also includes an additional SearchSpace IE (corresponding to third SS set discussed above). The IE provides information related PDCCH monitoring on PCell slots for DCI formats that can schedule PDSCH/PUSCH for the PCell when sSCell is deactivated.

In some examples, the third embodiment can require additional RRC overhead (e.g., an extra full set of PDCCH SS set parameters may be needed to be signaled to the UE), but in turn it lets the NW configure the PDCCH monitoring more flexibly and efficiently. For example, not just the number of monitoring candidates but the periodicity, duration offset for PDCCH monitoring can be configured independently based on BW, duplexing configuration, MBSFN configuration (if used) applicable to the DSS carrier on which the PCell is operated etc.

The SearchSpace IE for the sSCell can also include a parameter 'nrofCandidates' providing information on number of PDCCH monitoring candidates to monitor on sSCell slots for DCI formats that can schedule PDSCH/PUSCH for the sSCell.

For all the embodiments discussed above (the first embodiment, second embodiment, and third embodiment), regardless of sSCell being activated or not, the UE may monitor PDCCH candidates on the PCell for DCI formats that can schedule PDSCH/PUSCH for the PCell based parameters of some other SS sets configured as part of RRC configuration on the PCell (e.g. based on parameters of SS sets other than the second SS set). The other SS sets can be common search space sets with Type 0/0A/1/2/3 or other UE specific search space sets.

The above procedures for DCI formats that can schedule PDSCH/PUSCH can also be extended to DCI format(s) when they are used for triggering SRS.

In the above embodiments, the terms "primary cell" or PCell can refer to PCell for a UE not configured with DC. For a UE configured with DC, they can refer to PCell of MCG or PSCell of SCG.

In some embodiments, operations executable by a UE can perform PDCCH monitoring for enhanced cross-carrier scheduling. The operations can include receiving a RRC layer message configuring cross-carrier scheduling from a first serving cell configured for the UE to a second serving cell, and in response to receiving the RRC layer message. Receiving the RRC layer message can include monitoring, when the first serving cell is activated, a first number of PDCCH candidates on slots of the first serving cell for DCI formats with PDSCH resource assignments (and/or PUSCH grants) for the second serving cell.

The operations can further include receiving a command. In some examples, in response to receiving the command, the UE can stop monitoring PDCCH candidates on the slots of the first serving cell. In additional or alternative examples, in response to receiving the command, the UE can monitor a second number of PDCCH candidates on slots of the second serving cell for DCI formats with PDSCH resource assignments (and/or PUSCH grants) for the second serving cell.

The first number is determined based on a first RRC configured parameter. The second number is determined based on scaling the first RRC configured parameter using a scaling factor.

In additional or alternative embodiments, the scaling factor is based on SCS configuration of the first and second serving cells.

In additional or alternative embodiments, the operations can further include not monitoring the second number of PDCCH candidates on slots of the second serving cell for DCI formats with PDSCH resource assignments (and/or PUSCH grants) for the second serving cell, when monitoring PDCCH candidates on the slots of the first serving cell for DCI formats with PDSCH resource assignments (and/or PUSCH grants) for the second serving cell.

In some examples, these embodiments are related to the first embodiment. The first serving cell can be sSCell, second serving cell can be primary cell, command can be SCell deactivation MAC CE deactivating the sSCell or a SCell dormancy indication that switches the BWP of the sSCell to a dormant BWP.

In some embodiments, operations executable by a UE can perform PDCCH monitoring for enhanced cross-carrier scheduling with a first serving cell and a second serving cell. The operations include receiving a search space configuration as part of a RRC layer configuration for the second serving cell, the search space configuration including a first parameter indicating a first number of PDCCH monitoring candidates for a PDCCH CCE aggregation level and a second parameter indicating a second number of PDCCH monitoring candidates for the PDCCH CCE aggregation level.

The operations can further include receiving a RRC layer message configuring cross-carrier scheduling from a first serving cell configured for the UE to a second serving cell, and in response to receiving the RRC layer message. Receiving the RRC layer message can include monitoring, when the first serving cell is activated, a first number of PDCCH candidates on slots of the first serving cell for DCI formats with PDSCH resource assignments (and/or PUSCH grants) for the second serving cell, the first number determined from the first parameter.

The operations can further include receiving a command. In response to the command, the UE can stop monitoring PDCCH candidates on the slots of the first serving cell and monitoring, a second number of PDCCH candidates on slots of the second serving cell for DCI formats with PDSCH resource assignments (and/or PUSCH grants) for the second serving cell, the second number determined from the second parameter In additional or alternative embodiment, the operations further include not monitoring the second number of PDCCH candidates on slots of the second serving cell for DCI formats with PDSCH resource assignments (and/or PUSCH grants) for the second serving cell, when monitoring PDCCH candidates on the slots of the first serving cell for DCI formats with PDSCH resource assignments (and/or PUSCH grants) for the second serving cell.

In additional or alternative embodiments, the search space configuration includes a third parameter indicating a third number of PDCCH monitoring candidates for the PDCCH CCE aggregation level. The operations can further include monitoring, when the first serving cell is activated, a third number of PDCCH candidates on slots of the second serving cell for DCI formats with PDSCH resource assignments (and/or PUSCH grants) for the second serving cell, the third number determined from the third parameter.

In some examples, these embodiments are related to the second embodiment. The first serving cell can be sSCell, second serving cell can be primary cell, command can be SCell activation/deactivation MAC CE deactivating the sSCell or a SCell dormancy indication that switches the BWP of the sSCell to a dormant BWP.

In some embodiments, operations executable by a UE can perform PDCCH monitoring for enhanced cross-carrier scheduling using a first serving cell and a second serving cell. The operations can include receiving a first search space configuration and a second search space configuration as part of a RRC layer configuration for the second serving cell.

The operations can further include receiving a RRC layer message configuring cross-carrier scheduling from a first serving cell configured for the UE to a second serving cell, and in response to receiving the RRC layer message. Receiving the RRC layer message can include monitoring, when the first serving cell is activated, a first number of PDCCH candidates on slots of the first serving cell for DCI formats with PDSCH resource assignments (and/or PUSCH grants) for the second serving cell, the first number determined from at least one parameter of the first search space configuration.

The operations can further include receiving a command. In response to the command, the UE can stop monitoring PDCCH candidates on the slots of the first serving cell and monitor PDCCH candidates on slots of the second serving cell for DCI formats with PDSCH resource assignments (and/or PUSCH grants) for the second serving cell, based on the second search space configuration.

In additional or alternative embodiments, the operations can further include not monitoring PDCCH candidates on slots of the second serving cell for DCI formats with PDSCH resource assignments (and/or PUSCH grants) for the second serving cell, based on the second search space configuration, when monitoring PDCCH candidates on the slots of the first serving cell for DCI formats with PDSCH resource assignments (and/or PUSCH grants) for the second serving cell.

In additional or alternative embodiments, the operations can further include receiving a third search space configuration as part of a RRC layer configuration for the second serving cell, and monitoring, when the first serving cell is activated, PDCCH candidates on slots of the second serving cell for DCI formats with PDSCH resource assignments (and/or PUSCH grants) for the second serving cell, based on the third search space configuration.

In some examples, these embodiments are related to the third embodiment. The first serving cell can be sSCell, second serving cell can be primary cell, command can be SCell activation/deactivation MAC CE deactivating the sSCell or a SCell dormancy indication that switches the BWP of the sSCell to a dormant BWP.

In the description that follows, while the communication device may be any of the wireless device 1312A, 1312B, wired or wireless devices UE 1312C, UE 1312D, UE 1400, virtualization hardware 1704, virtual machines 1708A, 1708B, or UE 1806, the UE 200 (also referred to herein as communication device 1400) shall be used to describe the functionality of the operations of the communication device. Operations of the communication device 1400 (implemented using the structure of the block diagram of FIG. 14) will now be discussed with reference to the flow charts of FIGS. 7-9 according to some embodiments of inventive concepts. For example, modules may be stored in memory 1410 of FIG. 14, and these modules may provide instructions so that when the instructions of a module are executed by respective communication device processing circuitry 1402, processing circuitry 1402 performs respective operations of the flow charts.

Figure 7:
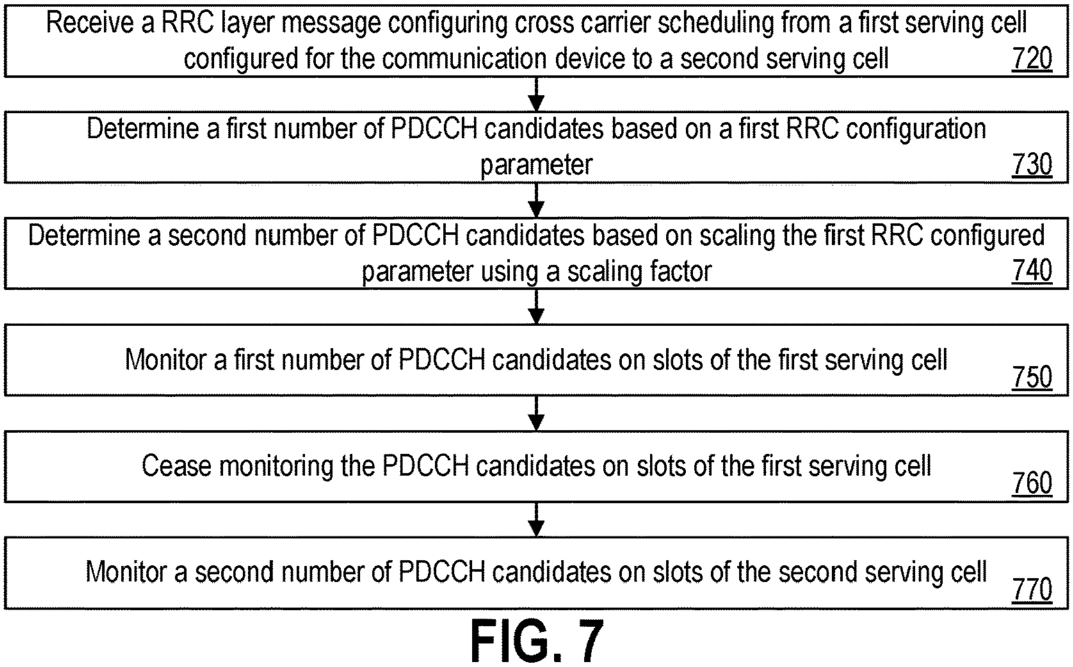
FIGS. 7, 8, and 9 are flow chart illustrating examples of operations of a communication device according to some embodiments of inventive concepts.
Figure 8:
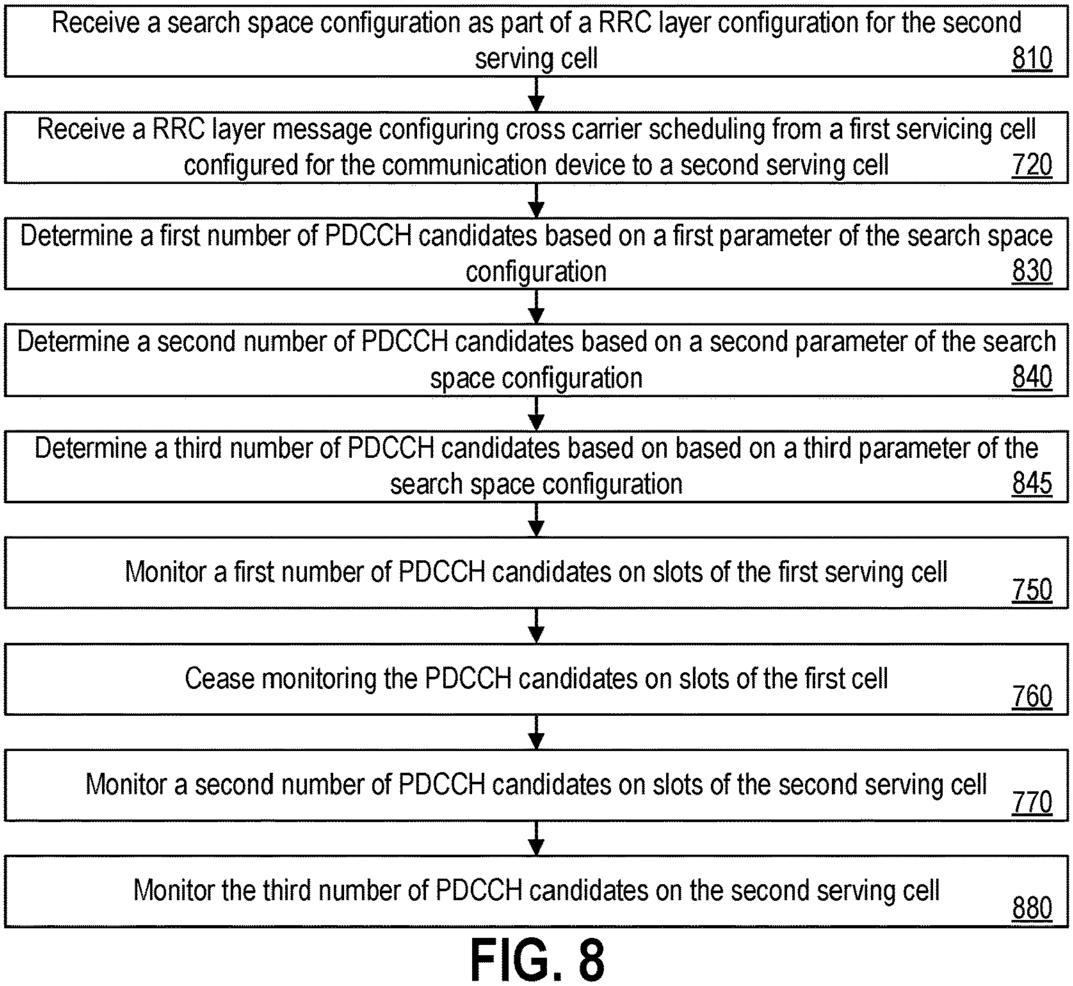
Figure 9:
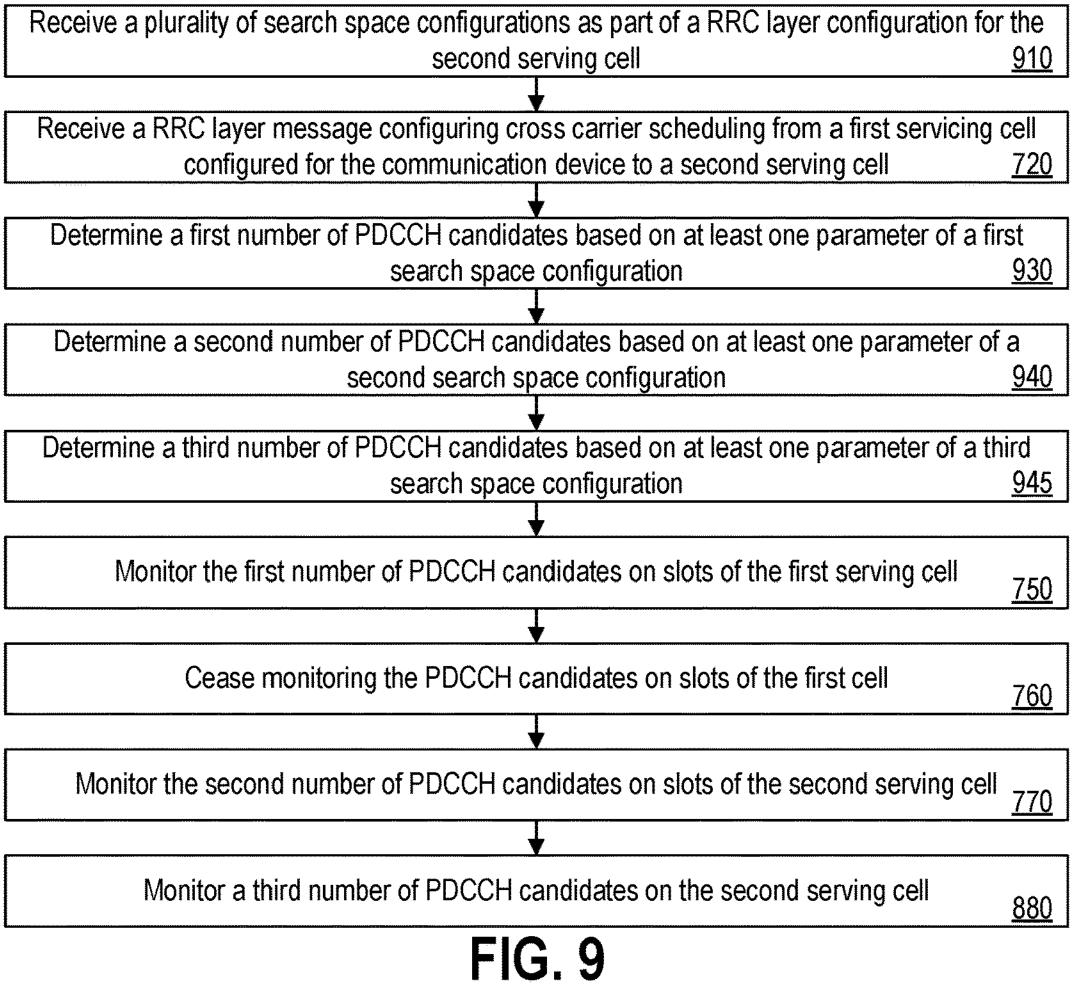

FIGS. 7-9 illustrate an examples of operations performed by a communication device for monitoring a physical downlink control channel, PDCCH, for enhanced cross carrier scheduling.

FIG. 7 illustrates an example of operations associated with the first embodiment described above.

At block 720, processing circuitry 1402 receives, via communication interface 1412, a RRC layer message configuring cross carrier scheduling from a first serving cell configured for the communication device to a second serving cell.

At block 730, processing circuitry 1402 determines a first number of PDCCH candidates based on a first RRC configuration parameter.

At block 740, processing circuitry 1402 determines a second number of PDCCH candidates based on scaling the first RRC configured parameter using a scaling factor. In some embodiments, the scaling factor is based on a SCS configuration of the first serving cell and the second serving cell.

At block 750, processing circuitry 1402 monitors a first number of PDCCH candidates on slots of the first serving cell. In some embodiments, the communication device monitors, while the first serving cell is activated, the first number of PDCCH candidates on slots of the first serving cell for DCI formats with PDSCH resource assignments and/or PUSCH grants for the second serving cell.

At block 760, processing circuitry 1402 ceases to monitor the PDCCH candidates on slots of the first serving cell.

At block 770, processing circuitry 1402 monitors a second number of PDCCH candidates on slots of the second serving cell.

FIG. 8 illustrates an example of operations associated with the second embodiment described above. Blocks 720, 750, 760, and 770 are similar to the same numbered blocks in FIG. 7.

At block 810, processing circuitry 1402 receives, via communication interface 1412, a search space configuration as part of a RRC layer configuration for the second serving cell. In some embodiments, the search space configuration includes a first parameter indicating a first number of PDCCH monitoring candidates for a PDCCH control channel element, CCE, aggregation level, a second parameter indicating a second number of PDCCH monitoring candidates for the PDCCH CCE aggregation level, and/or a third parameter indicating a third number of PDCCH monitoring candidates for the PDCCH CCE aggregation level.

At block 830, processing circuitry 1402 determines a first number of PDCCH candidates based on a first parameter of the search space configuration.

At block 840, processing circuitry 1402 determines a second number of PDCCH candidates based on a second parameter of the search space configuration.

At block 845, processing circuitry 1402 determines a third number of PDCCH candidates based on a third parameter of the search space configuration.

At block 880, processing circuitry 1402 monitors the third number of PDCCH candidates on the second serving cell.

FIG. 9 illustrates an example of operations associated with the third embodiment described above. Blocks 720, 750, 760, 770, and 880 are similar to the same numbered blocks in FIGS. 7-8.

At block 910, processing circuitry 1402 receives, via communication interface 1412, a plurality of search space configurations as part of a RRC layer configuration for the second serving cell. In some embodiments, the plurality of search space configurations include a first search space configuration, a second search space configuration, and a third search space configuration.

At block 930, processing circuitry 1402 determines a first number of PDCCH candidates based on at least one parameter of a first search space configuration.

At block 940, processing circuitry 1402 determines a second number of PDCCH candidates based on at least one parameter of a second search space configuration.

At block 945, processing circuitry 1402 determines a third number of PDCCH candidates based on at least one parameter of a third search space configuration.

In some embodiments, monitoring the first number of PDCCH candidates includes monitoring only the first number of PDCCH candidates on slots of the first serving cell.

In additional or alternative embodiments, monitoring only the first number of PDCCH candidates on slots of the first serving cell comprises ceasing monitoring the second number of PDCCH candidates on slots of the second serving cell.

Various operations from the flow chart of FIGS. 7-9 may be optional with respect to some embodiments of communication devices and related methods. For example, operations of blocks 730, 740 of FIG. 7; blocks 810, 830, 840, 845, and 880 of FIG. 8; and blocks 910, 930, 940, 945, and 880 of FIG. 12 may be optional.

In the description that follows, while the network node may be any of the network node 1310A, 1310B, 1500, 1806, hardware 1704, or virtual machine 1708A, 1708B, the network node 1500 shall be used to describe the functionality of the operations of the network node. Operations of the network node 1500 (implemented using the structure of FIG. 15) will now be discussed with reference to the flow chart of FIGS. 10-12 according to some embodiments of inventive concepts. For example, modules may be stored in memory 1504 of FIG. 15, and these modules may provide instructions so that when the instructions of a module are executed by respective network node processing circuitry 1502, processing circuitry 1502 performs respective operations of the flow charts.

Figure 10:
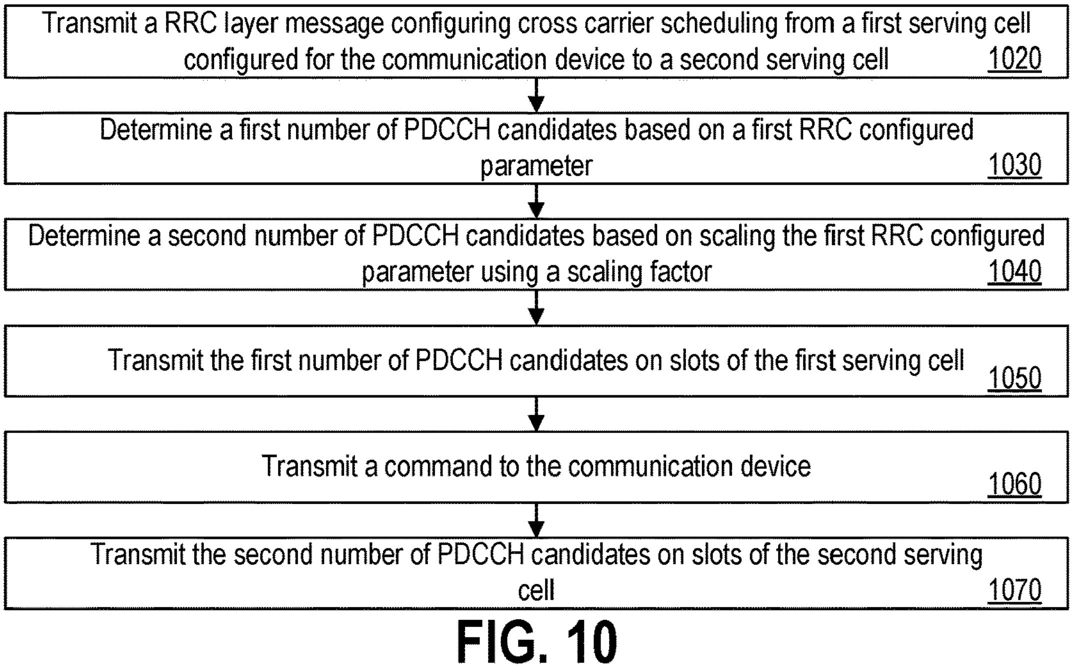
FIGS. 10, 11, and 12 are flow charts illustrating examples of operations of a network node according to some embodiments of inventive concepts.
Figure 11:
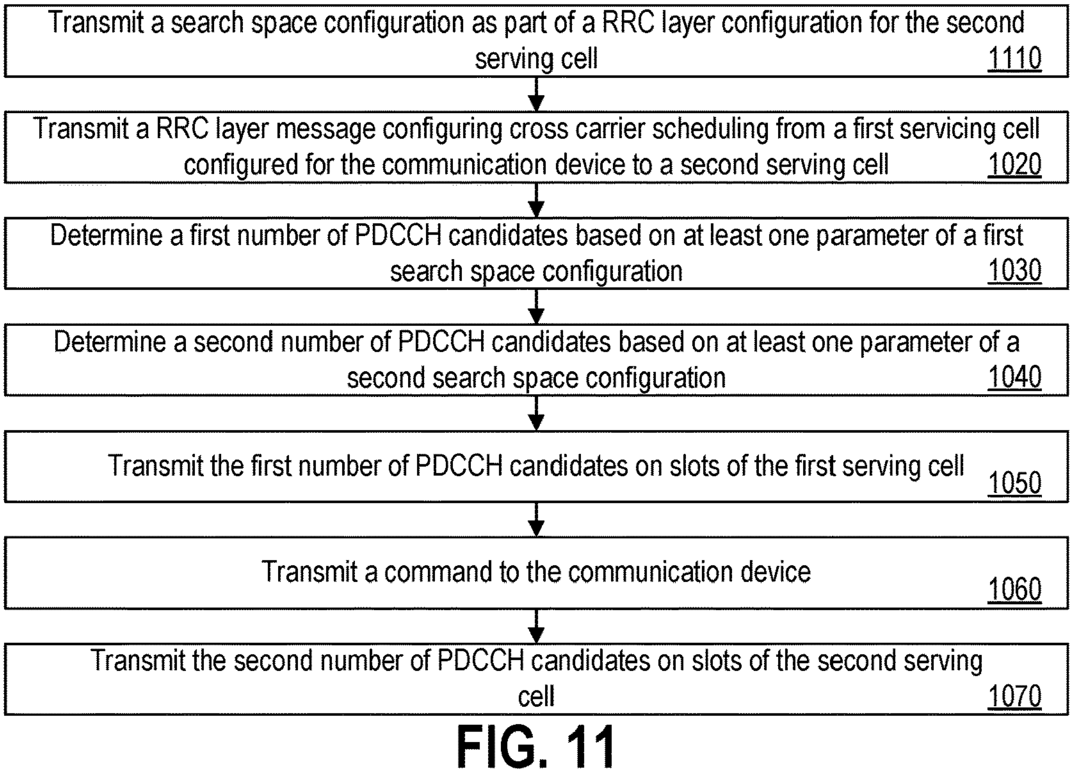
Figure 12:
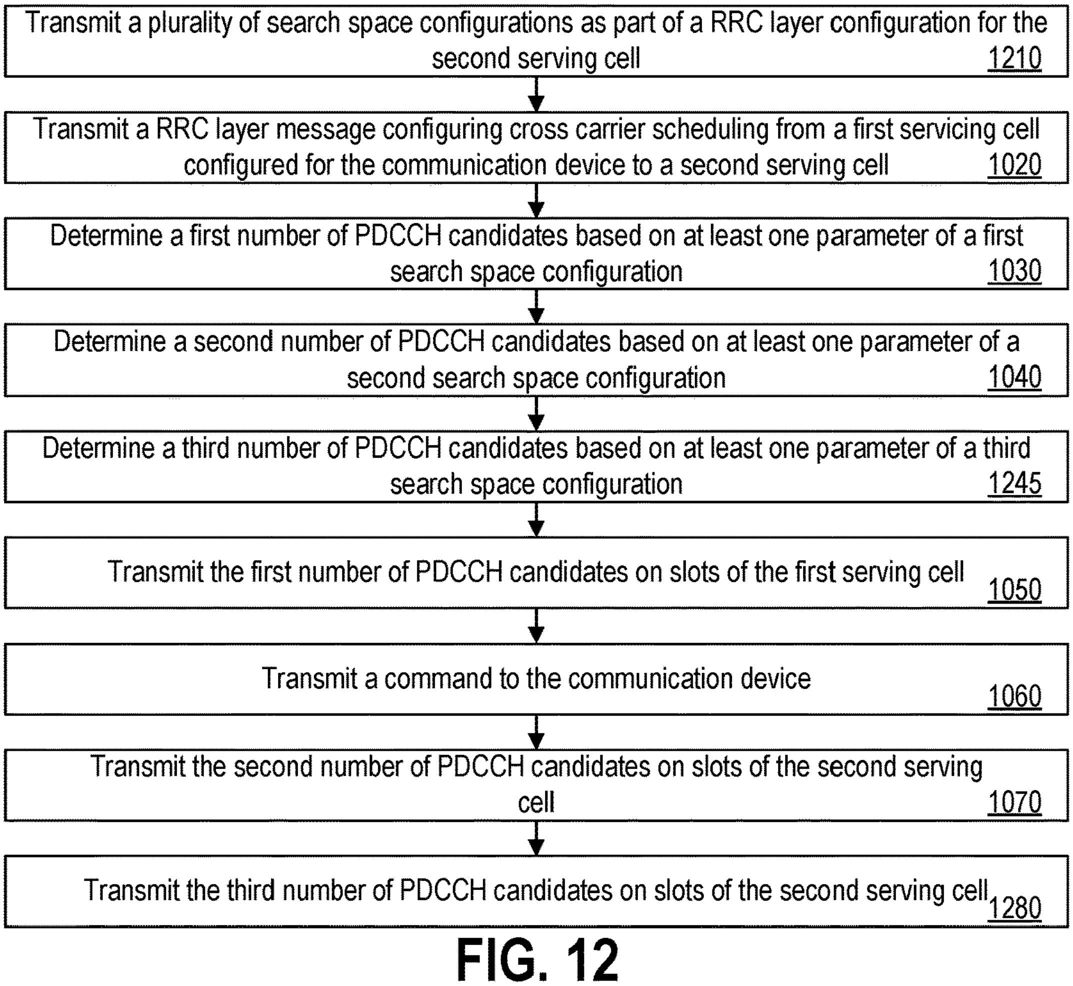

FIGS. 10-12 illustrates an example of operations performed by a network node operating in a communications network with a communication device monitoring a physical downlink control channel, PDCCH, for enhanced cross carrier scheduling.

FIG. 10 illustrates an example of operations associated with the first embodiment described above.

At block 1020, processing circuitry 1502 transmits, via communication interface 1506, a RRC layer message configuring cross carrier scheduling from a first serving cell configured for the communication device to a second serving cell.

At block 1030, processing circuitry 1502 determines a first number of PDCCH candidates based on a first RRC configured parameter.

At block 1040, processing circuitry 1502 determines a second number of PDCCH candidates based on scaling the first RRC configured parameter using a scaling factor. In some embodiments, the scaling factor is based on a SCS configuration of the first serving cell and second serving cells.

At block 1050, processing circuitry 1502 transmits, via communication interface 1506 and while the first serving cell is activated, a first number of PDCCH candidates on slots of the first serving cell for downlink control information, DCI, formats with physical downlink shared channel, PDSCH, resource assignments and/or PUSCH grants for the second serving cell.

At block 1060, processing circuitry 1502 transmits, via communication interface 1506, a command to the communication device. In some embodiments, the command includes an indication that the communication cease monitoring the PDCCH candidates on slots of the first cell.

At block 1070, processing circuitry 1502 transmits, via communication interface 1506, a second number of PDCCH candidates on slots of the second serving cell for DCI formats with PDSCH resource assignments and/or PUSCH grants for the second serving cell.

FIG. 11 illustrates an example of operations associated with the second embodiment described above.

At block 1110, processing circuitry 1502 transmits, via communication interface 1506, a search space configuration as part of a RRC layer configuration for the second serving cell. In some embodiments, the search space configuration includes a first parameter indicating the first number of PDCCH monitoring candidates for a PDCCH control channel element, CCE, aggregation level and a second parameter indicating the second number of PDCCH monitoring candidates for the PDCCH CCE aggregation level. In additional or alternative embodiments, the search space configuration further includes a third parameter indicating a third number of PDCCH monitoring candidates for the PDCCH CCE aggregation level.

FIG. 12 illustrates an example of operations associated with the third embodiment described above.

At block 1210, processing circuitry 1502 transmits, via communication interface 1506, a plurality of search space configurations as part of a RRC layer configuration for the second serving cell. In some embodiments, the plurality of search space configurations includes a first search space configuration and a second search space configuration. In additional or alternative embodiments, the first number of PDCCH candidates is determinable based on at least one parameter of the first search space configuration, and the second number of PDCCH candidates is determinable based on at least one parameter of the second search space configuration. In additional or alternative embodiments, the plurality of search space configurations further includes a third search space configuration and a third number of PDCCH candidates is determinable based on at least one parameter of the third search space configuration.

At block 1245, processing circuitry 1502 determines a third number of PDCCH candidates based on at least one parameter of a third search space configuration.

At block 1280, processing circuitry 1502 transmits, via communication interface 1506 and when the first serving cell is activated, the third number of PDCCH candidates on slots of the second serving cell for DCI formats with PDSCH resource assignments and/or PUSCH grants for the second serving cell.

Various operations from the flow charts of FIG. 10-12 may be optional with respect to some embodiments of network nodes and related methods. For example, operations of blocks 1030 and 1040 of FIG. 10; blocks 1110, 1030, and 1040 of FIG. 11; and blocks 1210, 1030, 1040, 1245, and 1280 of FIG. 12 may be optional.

Figure 13:
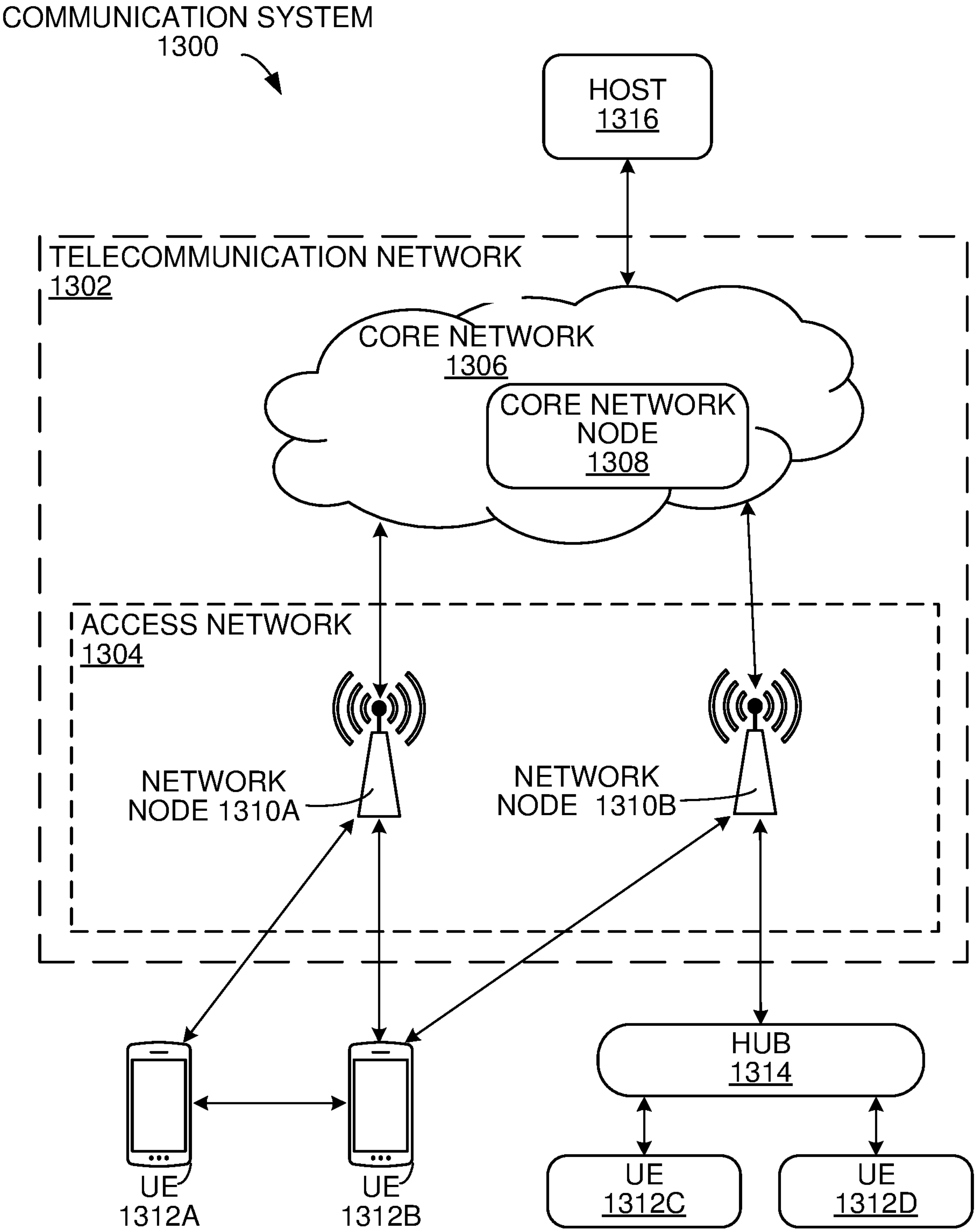
FIG. 13 is a block diagram of a communication system in accordance with some embodiments.

FIG. 13 shows an example of a communication system 1300 in accordance with some embodiments.

In the example, the communication system 1300 includes a telecommunication network 1302 that includes an access network 1304, such as a radio access network (RAN), and a core network 1306, which includes one or more core network nodes 1308. The access network 1304 includes one or more access network nodes, such as network nodes 1310*a* and 1310*b* (one or more of which may be generally referred to as network nodes 1310), or any other similar $3^{rd}$ Generation Partnership Project (3GPP) access node or non-3GPP access point. The network nodes 1310 facilitate direct or indirect connection of user equipment (UE), such as by connecting UEs 1312*a*, 1312*b*, 1312*c*, and 1312*d* (one or more of which may be generally referred to as UEs 1312) to the core network 1306 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 1300 may include any number of wired or wireless networks, network nodes, UEs, and/or any other components or systems that may facilitate or participate in the communication of data and/or signals whether via wired or wireless connections. The communication system 1300 may include and/or interface with any type of communication, telecommunication, data, cellular, radio network, and/or other similar type of system.

The UEs 1312 may be any of a wide variety of communication devices, including wireless devices arranged, configured, and/or operable to communicate wirelessly with the network nodes 1310 and other communication devices. Similarly, the network nodes 1310 are arranged, capable, configured, and/or operable to communicate directly or indirectly with the UEs 1312 and/or with other network nodes or equipment in the telecommunication network 1302 to enable and/or provide network access, such as wireless network access, and/or to perform other functions, such as administration in the telecommunication network 1302.

In the depicted example, the core network 1306 connects the network nodes 1310 to one or more hosts, such as host 1316. These connections may be direct or indirect via one or more intermediary networks or devices. In other examples, network nodes may be directly coupled to hosts. The core network 1306 includes one more core network nodes (e.g., core network node 1308) that are structured with hardware and software components. Features of these components may be substantially similar to those described with respect to the UEs, network nodes, and/or hosts, such that the descriptions thereof are generally applicable to the corresponding components of the core network node 1308. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 1316 may be under the ownership or control of a service provider other than an operator or provider of the access network 1304 and/or the telecommunication network 1302, and may be operated by the service provider or on behalf of the service provider. The host 1316 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 1300 of FIG. 13 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, WiFi, and/or any low-power wide-area network (LPWAN) standards such as LoRa and Sigfox.

In some examples, the telecommunication network 1302 is a cellular network that implements 3GPP standardized features. Accordingly, the telecommunications network 1302 may support network slicing to provide different logical networks to different devices that are connected to the telecommunication network 1302. For example, the telecommunications network 1302 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 1312 are configured to transmit and/or receive information without direct human interaction. For instance, a UE may be designed to transmit information to the access network 1304 on a predetermined schedule, when triggered by an internal or external event, or in response to requests from the access network 1304. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 1314 communicates with the access network 1304 to facilitate indirect communication between one or more UEs (e.g., UE 1312*c* and/or 1312*d*) and network nodes (e.g., network node 1310*b*). In some examples, the hub 1314 may be a controller, router, content source and analytics, or any of the other communication devices described herein regarding UEs. For example, the hub 1314 may be a broadband router enabling access to the core network 1306 for the UEs. As another example, the hub 1314 may be a controller that sends commands or instructions to one or more actuators in the UEs. Commands or instructions may be received from the UEs, network nodes 1310, or by executable code, script, process, or other instructions in the hub 1314. As another example, the hub 1314 may be a data collector that acts as temporary storage for UE data and, in some embodiments, may perform analysis or other processing of the data. As another example, the hub 1314 may be a content source. For example, for a UE that is a VR headset, display, loudspeaker or other media delivery device, the hub 1314 may retrieve VR assets, video, audio, or other media or data related to sensory information via a network node, which the hub 1314 then provides to the UE either directly, after performing local processing, and/or after adding additional local content. In still another example, the hub 1314 acts as a proxy server or orchestrator for the UEs, in particular in if one or more of the UEs are low energy IoT devices.

The hub 1314 may have a constant/persistent or intermittent connection to the network node 1310*b*. The hub 1314 may also allow for a different communication scheme and/or schedule between the hub 1314 and UEs (e.g., UE 1312*c* and/or 1312*d*), and between the hub 1314 and the core network 1306. In other examples, the hub 1314 is connected to the core network 1306 and/or one or more UEs via a wired connection. Moreover, the hub 1314 may be configured to connect to an M2M service provider over the access network 1304 and/or to another UE over a direct connection. In some scenarios, UEs may establish a wireless connection with the network nodes 1310 while still connected via the hub 1314 via a wired or wireless connection. In some embodiments, the hub 1314 may be a dedicated hub—that is, a hub whose primary function is to route communications to/from the UEs from/to the network node 1310*b*. In other embodiments, the hub 1314 may be a non-dedicated hub—that is, a device which is capable of operating to route communications between the UEs and network node 1310*b*, but which is additionally capable of operating as a communication start and/or end point for certain data channels.

Figure 14:
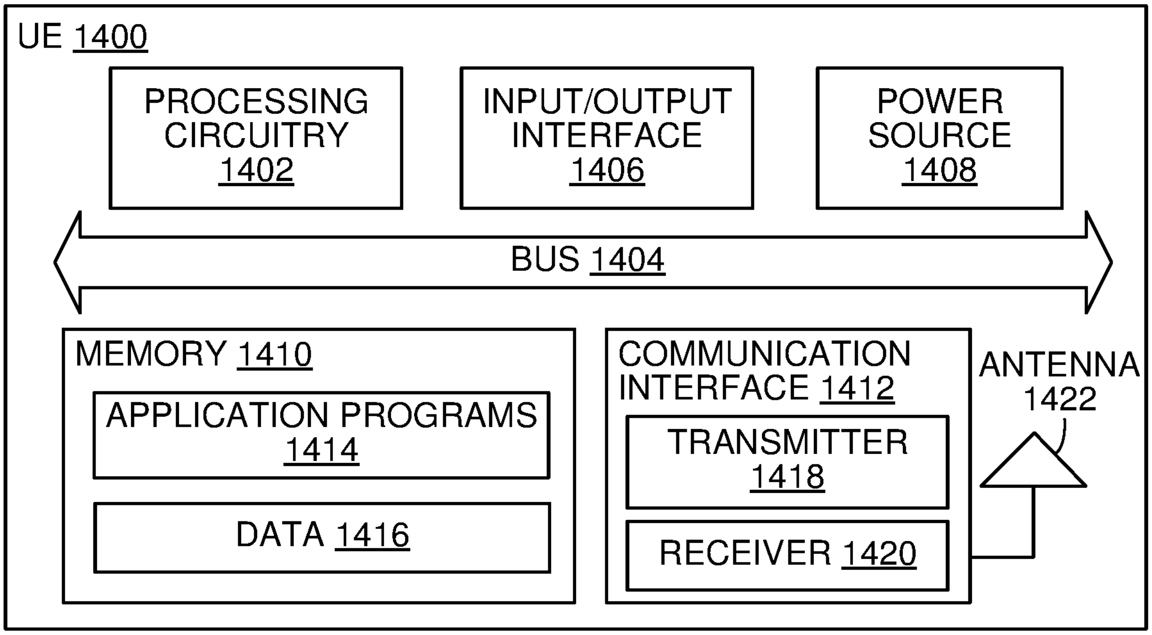
FIG. 14 is a block diagram of a user equipment in accordance with some embodiments

FIG. 14 shows a UE 1400 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1400 includes processing circuitry 1402 that is operatively coupled via a bus 1404 to an input/output interface 1406, a power source 1408, a memory 1410, a communication interface 1412, and/or any other component, or any combination thereof. Certain UEs may utilize all or a subset of the components shown in FIG. 14. The level of integration between the components may vary from one UE to another UE. Further, certain UEs may contain multiple instances of a component, such as multiple processors, memories, transceivers, transmitters, receivers, etc.

The processing circuitry 1402 is configured to process instructions and data and may be configured to implement any sequential state machine operative to execute instructions stored as machine-readable computer programs in the memory 1410. The processing circuitry 1402 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 1402 may include multiple central processing units (CPUs).

In the example, the input/output interface 1406 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1400. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1408 is structured as a battery or battery pack. Other types of power sources, such as an external power source (e.g., an electricity outlet), photovoltaic device, or power cell, may be used. The power source 1408 may further include power circuitry for delivering power from the power source 1408 itself, and/or an external power source, to the various parts of the UE 1400 via input circuitry or an interface such as an electrical power cable. Delivering power may be, for example, for charging of the power source 1408. Power circuitry may perform any formatting, converting, or other modification to the power from the power source 1408 to make the power suitable for the respective components of the UE 1400 to which power is supplied.

The memory 1410 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 1410 includes one or more application programs 1414, such as an operating system, web browser application, a widget, gadget engine, or other application, and corresponding data 1416. The memory 1410 may store, for use by the UE 1400, any of a variety of various operating systems or combinations of operating systems.

The memory 1410 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 1410 may allow the UE 1400 to access instructions, application programs and the like, stored on transitory or non-transitory memory media, to off-load data, or to upload data. An article of manufacture, such as one utilizing a communication system may be tangibly embodied as or in the memory 1410, which may be or comprise a device-readable storage medium.

The processing circuitry 1402 may be configured to communicate with an access network or other network using the communication interface 1412. The communication interface 1412 may comprise one or more communication subsystems and may include or be communicatively coupled to an antenna 1422. The communication interface 1412 may include one or more transceivers used to communicate, such as by communicating with one or more remote transceivers of another device capable of wireless communication (e.g., another UE or a network node in an access network). Each transceiver may include a transmitter 1418 and/or a receiver 1420 appropriate to provide network communications (e.g., optical, electrical, frequency allocations, and so forth). Moreover, the transmitter 1418 and receiver 1420 may be coupled to one or more antennas (e.g., antenna 1422) and may share circuit components, software or firmware, or alternatively be implemented separately.

In the illustrated embodiment, communication functions of the communication interface 1412 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 1412, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1400 shown in FIG. 14.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 15:
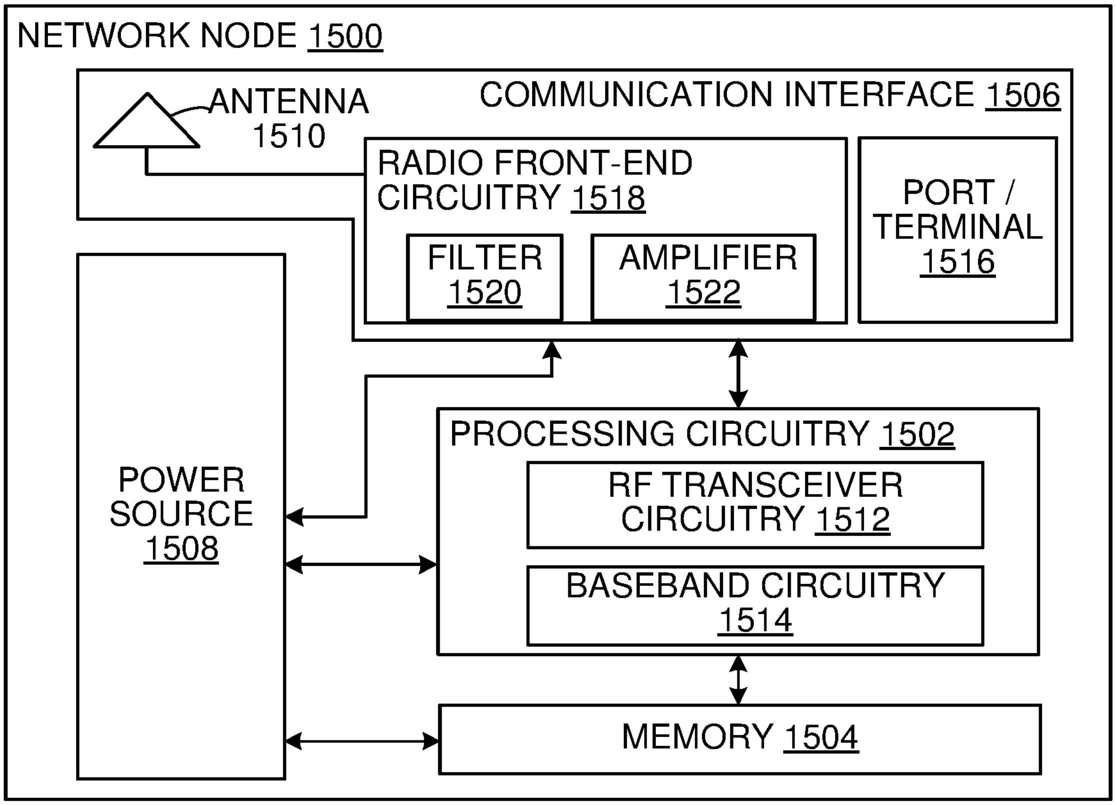
FIG. 15 is a block diagram of a network node in accordance with some embodiments.

FIG. 15 shows a network node 1500 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1500 includes a processing circuitry 1502, a memory 1504, a communication interface 1506, and a power source 1508. The network node 1500 may be composed of multiple physically separate components (e.g., a NodeB component and a RNC component, or a BTS component and a BSC component, etc.), which may each have their own respective components. In certain scenarios in which the network node 1500 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 1500 may be configured to support multiple radio access technologies (RATs). In such embodiments, some components may be duplicated (e.g., separate memory 1504 for different RATs) and some components may be reused (e.g., a same antenna 1510 may be shared by different RATs). The network node 1500 may also include multiple sets of the various illustrated components for different wireless technologies integrated into network node 1500, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 1500.

The processing circuitry 1502 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1500 components, such as the memory 1504, to provide network node 1500 functionality.

In some embodiments, the processing circuitry 1502 includes a system on a chip (SOC). In some embodiments, the processing circuitry 1502 includes one or more of radio frequency (RF) transceiver circuitry 1512 and baseband processing circuitry 1514. In some embodiments, the radio frequency (RF) transceiver circuitry 1512 and the baseband processing circuitry 1514 may be on separate chips (or sets of chips), boards, or units, such as radio units and digital units. In alternative embodiments, part or all of RF transceiver circuitry 1512 and baseband processing circuitry 1514 may be on the same chip or set of chips, boards, or units.

The memory 1504 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 1502. The memory 1504 may store any suitable instructions, data, or information, including a computer program, software, an application including one or more of logic, rules, code, tables, and/or other instructions capable of being executed by the processing circuitry 1502 and utilized by the network node 1500. The memory 1504 may be used to store any calculations made by the processing circuitry 1502 and/or any data received via the communication interface 1506. In some embodiments, the processing circuitry 1502 and memory 1504 is integrated.

The communication interface 1506 is used in wired or wireless communication of signaling and/or data between a network node, access network, and/or UE. As illustrated, the communication interface 1506 comprises port(s)/terminal(s) 1516 to send and receive data, for example to and from a network over a wired connection. The communication interface 1506 also includes radio front-end circuitry 1518 that may be coupled to, or in certain embodiments a part of, the antenna 1510. Radio front-end circuitry 1518 comprises filters 1520 and amplifiers 1522. The radio front-end circuitry 1518 may be connected to an antenna 1510 and processing circuitry 1502. The radio front-end circuitry may be configured to condition signals communicated between antenna 1510 and processing circuitry 1502. The radio front-end circuitry 1518 may receive digital data that is to be sent out to other network nodes or UEs via a wireless connection. The radio front-end circuitry 1518 may convert the digital data into a radio signal having the appropriate channel and bandwidth parameters using a combination of filters 1520 and/or amplifiers 1522. The radio signal may then be transmitted via the antenna 1510. Similarly, when receiving data, the antenna 1510 may collect radio signals which are then converted into digital data by the radio front-end circuitry 1518. The digital data may be passed to the processing circuitry 1502. In other embodiments, the communication interface may comprise different components and/or different combinations of components.

In certain alternative embodiments, the network node 1500 does not include separate radio front-end circuitry 1518, instead, the processing circuitry 1502 includes radio front-end circuitry and is connected to the antenna 1510. Similarly, in some embodiments, all or some of the RF transceiver circuitry 1512 is part of the communication interface 1506. In still other embodiments, the communication interface 1506 includes one or more ports or terminals 1516, the radio front-end circuitry 1518, and the RF transceiver circuitry 1512, as part of a radio unit (not shown), and the communication interface 1506 communicates with the baseband processing circuitry 1514, which is part of a digital unit (not shown).

The antenna 1510 may include one or more antennas, or antenna arrays, configured to send and/or receive wireless signals. The antenna 1510 may be coupled to the radio front-end circuitry 1518 and may be any type of antenna capable of transmitting and receiving data and/or signals wirelessly. In certain embodiments, the antenna 1510 is separate from the network node 1500 and connectable to the network node 1500 through an interface or port.

The antenna 1510, communication interface 1506, and/or the processing circuitry 1502 may be configured to perform any receiving operations and/or certain obtaining operations described herein as being performed by the network node. Any information, data and/or signals may be received from a UE, another network node and/or any other network equipment. Similarly, the antenna 1510, the communication interface 1506, and/or the processing circuitry 1502 may be configured to perform any transmitting operations described herein as being performed by the network node. Any information, data and/or signals may be transmitted to a UE, another network node and/or any other network equipment.

The power source 1508 provides power to the various components of network node 1500 in a form suitable for the respective components (e.g., at a voltage and current level needed for each respective component). The power source 1508 may further comprise, or be coupled to, power management circuitry to supply the components of the network node 1500 with power for performing the functionality described herein. For example, the network node 1500 may be connectable to an external power source (e.g., the power grid, an electricity outlet) via an input circuitry or interface such as an electrical cable, whereby the external power source supplies power to power circuitry of the power source 1508. As a further example, the power source 1508 may comprise a source of power in the form of a battery or battery pack which is connected to, or integrated in, power circuitry. The battery may provide backup power should the external power source fail.

Embodiments of the network node 1500 may include additional components beyond those shown in FIG. 15 for providing certain aspects of the network node's functionality, including any of the functionality described herein and/or any functionality necessary to support the subject matter described herein. For example, the network node 1500 may include user interface equipment to allow input of information into the network node 1500 and to allow output of information from the network node 1500. This may allow a user to perform diagnostic, maintenance, repair, and other administrative functions for the network node 1500.

Figure 16:
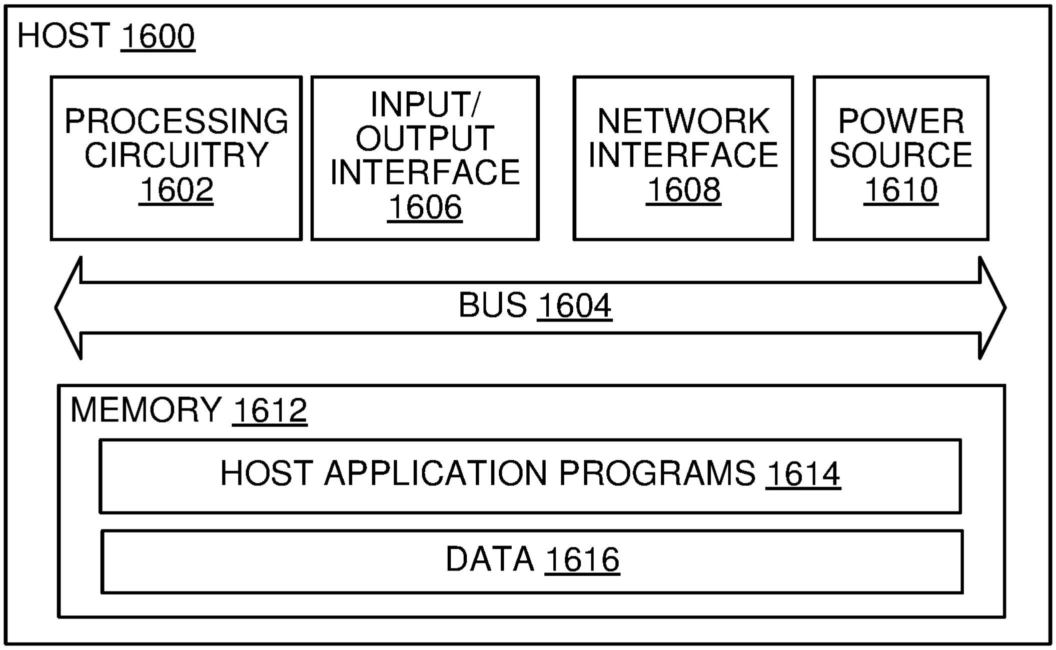
FIG. 16 is a block diagram of a host computer communicating with a user equipment in accordance with some embodiments.

FIG. 16 is a block diagram of a host 1600, which may be an embodiment of the host 1316 of FIG. 13, in accordance with various aspects described herein. As used herein, the host 1600 may be or comprise various combinations hardware and/or software, including a standalone server, a blade server, a cloud-implemented server, a distributed server, a virtual machine, container, or processing resources in a server farm. The host 1600 may provide one or more services to one or more UEs.

The host 1600 includes processing circuitry 1602 that is operatively coupled via a bus 1604 to an input/output interface 1606, a network interface 1608, a power source 1610, and a memory 1612. Other components may be included in other embodiments. Features of these components may be substantially similar to those described with respect to the devices of previous figures, such as FIGS. 14 and 15, such that the descriptions thereof are generally applicable to the corresponding components of host 1600.

The memory 1612 may include one or more computer programs including one or more host application programs 1614 and data 1616, which may include user data, e.g., data generated by a UE for the host 1600 or data generated by the host 1600 for a UE. Embodiments of the host 1600 may utilize only a subset or all of the components shown. The host application programs 1614 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1614 may also provide for user authentication and licensing checks and may periodically report health, routes, and content availability to a central node, such as a device in or on the edge of a core network. Accordingly, the host 1600 may select and/or indicate a different host for over-the-top services for a UE. The host application programs 1614 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 17:
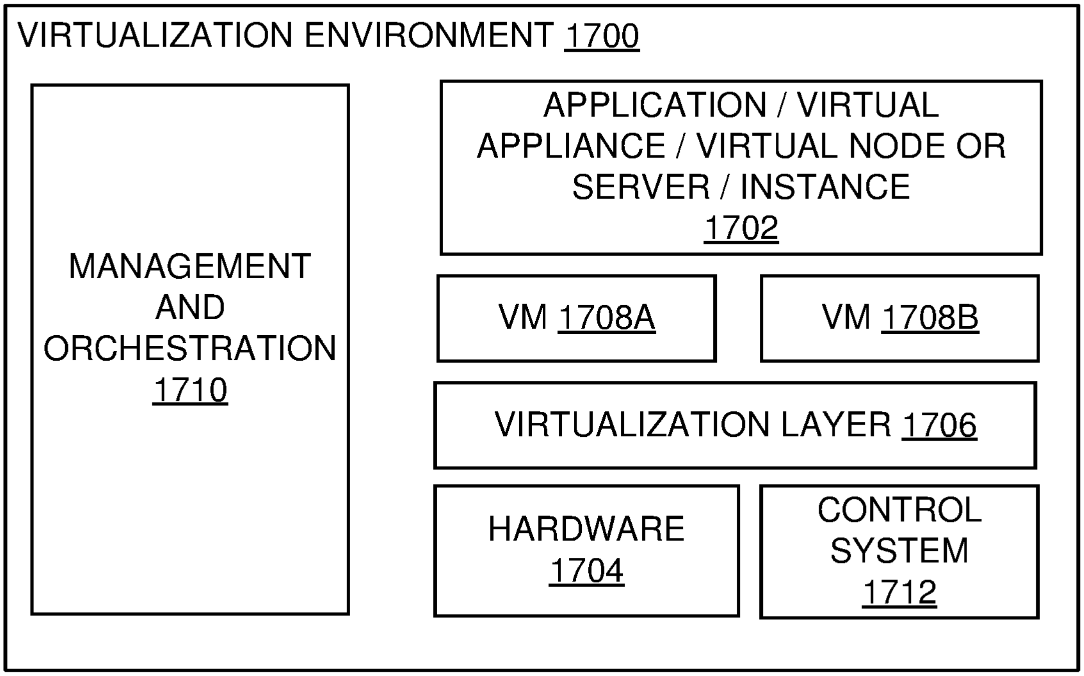
FIG. 17 is a block diagram of a virtualization environment in accordance with some embodiments.

FIG. 17 is a block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1700 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1702 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1704 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1706 (also referred to as hypervisors or virtual machine monitors (VMMs)), provide VMs **1708*a* and 1708*b* (one or more of which may be generally referred to as VMs 1708), and/or perform any of the functions, features and/or benefits described in relation with some embodiments described herein. The virtualization layer 1706 may present a virtual operating platform that appears like networking hardware to the VMs 1708**.

The VMs 1708 comprise virtual processing, virtual memory, virtual networking or interface and virtual storage, and may be run by a corresponding virtualization layer 1706. Different embodiments of the instance of a virtual appliance 1702 may be implemented on one or more of VMs 1708, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1708 may be a software implementation of a physical machine that runs programs as if they were executing on a physical, non-virtualized machine. Each of the VMs 1708, and that part of hardware 1704 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1708 on top of the hardware 1704 and corresponds to the application 1702.

Hardware 1704 may be implemented in a standalone network node with generic or specific components. Hardware 1704 may implement some functions via virtualization. Alternatively, hardware 1704 may be part of a larger cluster of hardware (e.g. such as in a data center or CPE) where many hardware nodes work together and are managed via management and orchestration 1710, which, among others, oversees lifecycle management of applications 1702. In some embodiments, hardware 1704 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1712 which may alternatively be used for communication between hardware nodes and radio units.

Figure 18:
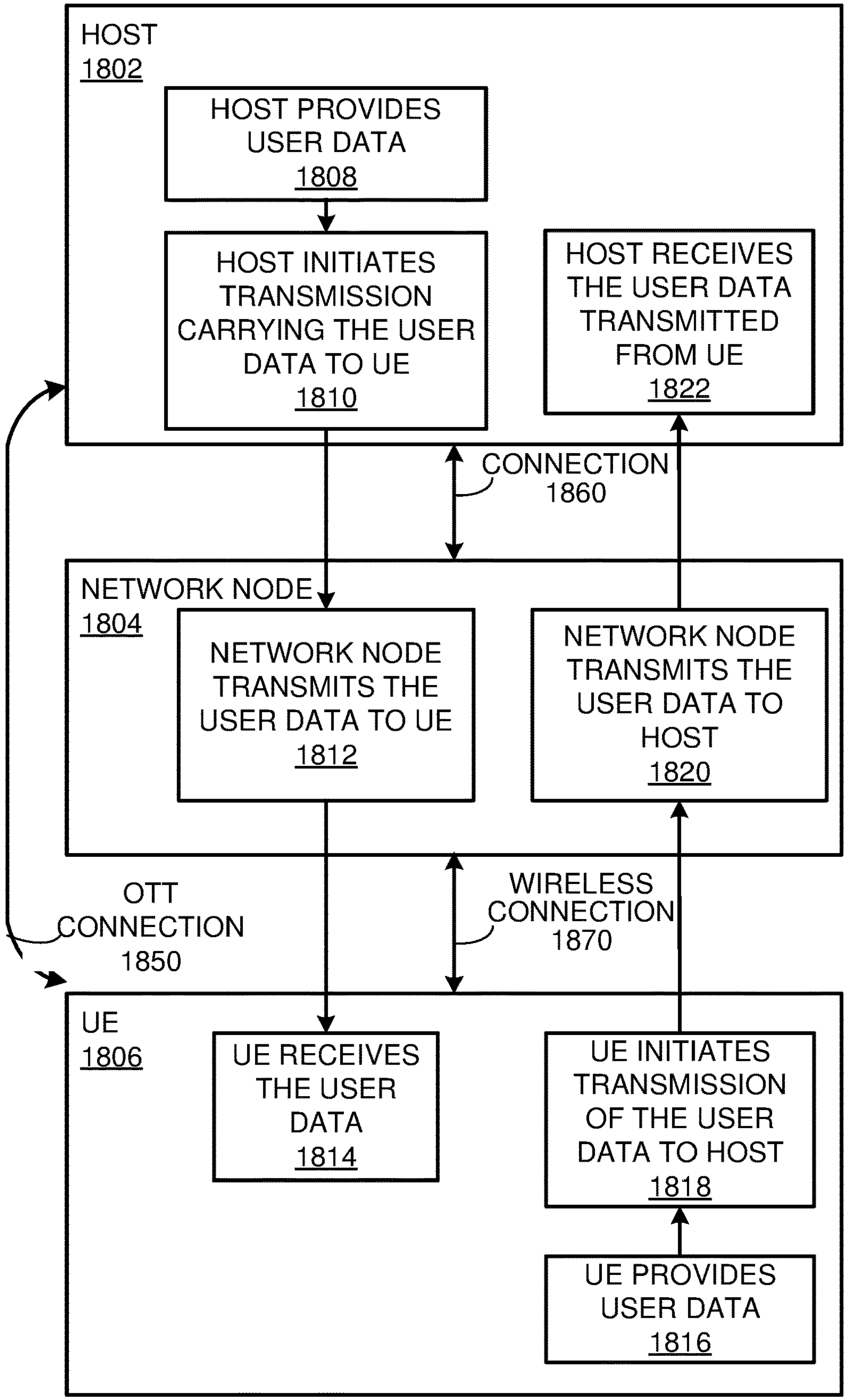
FIG. 18 is a block diagram of a host computer communicating via a base station with a user equipment over a partially wireless connection in accordance with some embodiments in accordance with some embodiments.

FIG. 18 shows a communication diagram of a host 1802 communicating via a network node 1804 with a UE 1806 over a partially wireless connection in accordance with some embodiments. Example implementations, in accordance with various embodiments, of the UE (such as a UE 1312*a* of FIG. 13 and/or UE 1400 of FIG. 14), network node (such as network node 1310*a* of FIG. 13 and/or network node 1500 of FIG. 15), and host (such as host 1316 of FIG. 13 and/or host 1600 of FIG. 16) discussed in the preceding paragraphs will now be described with reference to FIG. 18.

Like host 1600, embodiments of host 1802 include hardware, such as a communication interface, processing circuitry, and memory. The host 1802 also includes software, which is stored in or accessible by the host 1802 and executable by the processing circuitry. The software includes a host application that may be operable to provide a service to a remote user, such as the UE 1806 connecting via an over-the-top (OTT) connection 1850 extending between the UE 1806 and host 1802. In providing the service to the remote user, a host application may provide user data which is transmitted using the OTT connection 1850.

The network node 1804 includes hardware enabling it to communicate with the host 1802 and UE 1806. The connection 1860 may be direct or pass through a core network (like core network 1306 of FIG. 13) and/or one or more other intermediate networks, such as one or more public, private, or hosted networks. For example, an intermediate network may be a backbone network or the Internet.

The UE 1806 includes hardware and software, which is stored in or accessible by UE 1806 and executable by the UE's processing circuitry. The software includes a client application, such as a web browser or operator-specific "app" that may be operable to provide a service to a human or non-human user via UE 1806 with the support of the host 1802. In the host 1802, an executing host application may communicate with the executing client application via the OTT connection 1850 terminating at the UE 1806 and host 1802. In providing the service to the user, the UE's client application may receive request data from the host's host application and provide user data in response to the request data. The OTT connection 1850 may transfer both the request data and the user data. The UE's client application may interact with the user to generate the user data that it provides to the host application through the OTT connection 1850.

The OTT connection 1850 may extend via a connection 1860 between the host 1802 and the network node 1804 and via a wireless connection 1870 between the network node 1804 and the UE 1806 to provide the connection between the host 1802 and the UE 1806. The connection 1860 and wireless connection 1870, over which the OTT connection 1850 may be provided, have been drawn abstractly to illustrate the communication between the host 1802 and the UE 1806 via the network node 1804, without explicit reference to any intermediary devices and the precise routing of messages via these devices.

As an example of transmitting data via the OTT connection 1850, in step 1808, the host 1802 provides user data, which may be performed by executing a host application. In some embodiments, the user data is associated with a particular human user interacting with the UE 1806. In other embodiments, the user data is associated with a UE 1806 that shares data with the host 1802 without explicit human interaction. In step 1810, the host 1802 initiates a transmission carrying the user data towards the UE 1806. The host 1802 may initiate the transmission responsive to a request transmitted by the UE 1806. The request may be caused by human interaction with the UE 1806 or by operation of the client application executing on the UE 1806. The transmission may pass via the network node 1804, in accordance with the teachings of the embodiments described throughout this disclosure. Accordingly, in step 1812, the network node 1804 transmits to the UE 1806 the user data that was carried in the transmission that the host 1802 initiated, in accordance with the teachings of the embodiments described throughout this disclosure. In step 1814, the UE 1806 receives the user data carried in the transmission, which may be performed by a client application executed on the UE 1806 associated with the host application executed by the host 1802.

In some examples, the UE 1806 executes a client application which provides user data to the host 1802. The user data may be provided in reaction or response to the data received from the host 1802. Accordingly, in step 1816, the UE 1806 may provide user data, which may be performed by executing the client application. In providing the user data, the client application may further consider user input received from the user via an input/output interface of the UE 1806. Regardless of the specific manner in which the user data was provided, the UE 1806 initiates, in step 1818, transmission of the user data towards the host 1802 via the network node 1804. In step 1820, in accordance with the teachings of the embodiments described throughout this disclosure, the network node 1804 receives user data from the UE 1806 and initiates transmission of the received user data towards the host 1802. In step 1822, the host 1802 receives the user data carried in the transmission initiated by the UE 1806.

One or more of the various embodiments improve the performance of OTT services provided to the UE 1806 using the OTT connection 1850, in which the wireless connection 1870 forms the last segment. More precisely, the teachings of these embodiments may allow a source node to determine whether to configure or not configure the SHR to the UE, and thereby saving configuration signaling and UE memory consumption.

In an example scenario, factory status information may be collected and analyzed by the host 1802. As another example, the host 1802 may process audio and video data which may have been retrieved from a UE for use in creating maps. As another example, the host 1802 may collect and analyze real-time data to assist in controlling vehicle congestion (e.g., controlling traffic lights). As another example, the host 1802 may store surveillance video uploaded by a UE. As another example, the host 1802 may store or control access to media content such as video, audio, VR or AR which it can broadcast, multicast or unicast to UEs. As other examples, the host 1802 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1850 between the host 1802 and UE 1806, in response to variations in the measurement results. The measurement procedure and/or the network functionality for reconfiguring the OTT connection may be implemented in software and hardware of the host 1802 and/or UE 1806. In some embodiments, sensors (not shown) may be deployed in or in association with other devices through which the OTT connection 1850 passes; the sensors may participate in the measurement procedure by supplying values of the monitored quantities exemplified above, or supplying values of other physical quantities from which software may compute or estimate the monitored quantities. The reconfiguring of the OTT connection 1850 may include message format, retransmission settings, preferred routing etc.; the reconfiguring need not directly alter the operation of the network node 1804. Such procedures and functionalities may be known and practiced in the art. In certain embodiments, measurements may involve proprietary UE signaling that facilitates measurements of throughput, propagation times, latency and the like, by the host 1802. The measurements may be implemented in that software causes messages to be transmitted, in particular empty or 'dummy' messages, using the OTT connection 1850 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

What is claimed is:

1. A method performed by a communication device for monitoring a physical downlink control channel, PDCCH, for enhanced cross carrier scheduling, the method comprising:

receiving a radio resource control, RRC, layer message configuring cross carrier scheduling from a first serving cell configured for the communication device to a second serving cell;

receiving a plurality of search space configurations as part of a RRC layer configuration for the second serving cell, the plurality of search space configurations including a first search space configuration and a second search space configuration;

responsive to receiving the RRC layer message, monitoring, while the first serving cell is activated, a first number of PDCCH monitoring candidates on slots of the first serving cell for downlink control information, DCI, formats with physical downlink shared channel, PDSCH, resource assignments and/or physical uplink shared channel, PUSCH, grants for the second serving cell, wherein the first number of PDCCH monitoring candidates are determined by the communication device based on at least one parameter of the first search space configuration; and responsive to receiving a command:

ceasing to monitor the first number of PDCCH monitoring candidates on slots of the first serving cell, and monitoring a second number of PDCCH monitoring candidates on slots of the second serving cell for DCI formats with PDSCH resource assignments and/or PUSCH grants for the second serving cell, wherein the second number of PDCCH monitoring candidates are determined by the communication device based on at least one parameter of the second search space configuration.

2. The method of claim 1, wherein the command is a serving cell deactivation Medium Access Control Command Element, MAC CE, deactivating the first serving cell or a serving cell dormancy indication that switches a bandwidth part, BWP, of the first serving cell to a dormant BWP.

3. The method of claim 1, further comprising:
determining the first number of PDCCH monitoring candidates based on a first RRC configured parameter.

4. The method of claim 3, further comprising:
determining the second number of PDCCH monitoring candidates based on scaling a value indicated by the first RRC configured parameter using a scaling factor.

5. The method of claim 4, wherein the scaling factor is based on a Sub carrier spacing, SCS, configuration of the first serving cell and second serving cell.

6. The method of claim 3, further comprising:
receiving the first RRC configured parameter in a search space configuration as part of a RRC layer configuration for the second serving cell.

7. The method of claim 3, wherein the first RRC configured parameter indicates the first number of PDCCH monitoring candidates.

8. The method of claim 1, further comprising:
receiving a search space configuration as part of a RRC layer configuration for the second serving cell, the search space configuration including a first parameter indicating the first number of PDCCH monitoring candidates for a PDCCH control channel element, CCE, aggregation level and a second parameter indicating the second number of PDCCH monitoring candidates for the PDCCH CCE aggregation level.

9. The method of claim 8, wherein the search space configuration further includes a third parameter indicating a third number of PDCCH monitoring candidates for the PDCCH CCE aggregation level,
the method further comprising:
monitoring, while the first serving cell is activated, the third number of PDCCH monitoring candidates on the second serving cell for DCI formats with PDSCH resource assignments and/or PUSCH grants for the second serving cell.

10. The method of claim 1, further comprising:
responsive to the first serving cell being activated or an active bandwidth part, BWP, of the first serving cell being set to a non-dormant BWP, ceasing to monitor the second number of PDCCH monitoring candidates based on the at least one parameter of the second search space configuration.

11. The method of claim 10, wherein the plurality of search space configurations further include a third search space configuration,
the method further comprising:
determining a third number of PDCCH monitoring candidates based on at least one parameter of the third search space configuration; and
monitoring, when the first serving cell is activated, the third number of PDCCH monitoring candidates on slots of the second serving cell for DCI formats with PDSCH resource assignments and/or PUSCH grants for the second serving cell.

12. The method of claim 1, wherein monitoring the first number of PDCCH monitoring candidates comprises monitoring only the first number of PDCCH monitoring candidates on slots of the first serving cell for downlink control information, DCI, formats with physical downlink shared channel, PDSCH, resource assignments and/or PUSCH grants for the second serving cell.

13. The method of claim 12, wherein monitoring only the first number of PDCCH monitoring candidates on slots of the first serving cell comprises ceasing monitoring the second number of PDCCH monitoring candidates on slots of the second serving cell for downlink control information, DCI, formats with physical downlink shared channel, PDSCH, resource assignments and/or PUSCH grants for the second serving cell.

14. The method of claim 1, wherein the first serving cell is a Secondary serving cell (SCell) and second serving cell is a Primary serving cell (PCell).

15. The method of claim 1, further comprising:
monitoring a fourth number of PDCCH monitoring candidates based on common search space sets of the second serving cell regardless of whether the first serving cell is activated or not.

16. A method performed by a network node operating in a communications network with a communication device monitoring a physical downlink control channel, PDCCH, for enhanced cross carrier scheduling, the method comprising:
transmitting a radio resource control, RRC, layer message configuring cross-carrier scheduling from a first serving cell configured for the communication device to a second serving cell;
transmitting a plurality of search space configurations as part of a RRC layer configuration for the second serving cell, the plurality of search space configurations including a first search space configuration and a second search space configuration;
responsive to transmitting the RRC layer message, transmitting, while the first serving cell is activated, a first number of PDCCH monitoring candidates on slots of the first serving cell for downlink control information, DCI, formats with physical downlink shared channel, PDSCH, resource assignments and/or physical uplink shared channel, PUSCH, grants for the second serving cell, wherein the first number of PDCCH monitoring candidates is determinable based on at least one parameter of the first search space configuration;
transmitting a command to the communication device, the command including an indication that the communication device cease monitoring the PDCCH monitoring candidates on slots of the first serving cell; and
transmitting a second number of PDCCH monitoring candidates on slots of the second serving cell for DCI formats with PDSCH resource assignments and/or PUSCH grants for the second serving cell, wherein the second number of PDCCH monitoring candidates is determinable based on at least one parameter of the second search space configuration.

17. The method of claim 16, further comprising:
determining the first number of PDCCH monitoring candidates based on a first RRC configured parameter.

18. The method of claim 17, further comprising:
determining the second number of PDCCH monitoring candidates based on scaling the first RRC configured parameter using a scaling factor.

19. The method of claim 18, wherein the scaling factor is based on a SCS configuration of the first serving cell and second serving cells.

20. The method of claim 16, further comprising:

transmitting a search space configuration as part of a RRC layer configuration for the second serving cell, the search space configuration including a first parameter indicating the first number of PDCCH monitoring candidates for a PDCCH control channel element, CCE, aggregation level and a second parameter indicating the second number of PDCCH monitoring candidates for the PDCCH CCE aggregation level.

21. The method of claim 20, wherein the search space configuration further includes a third parameter indicating a third number of PDCCH monitoring candidates for the PDCCH CCE aggregation level.

22. The method of claim 21, wherein the plurality of search space configurations further include a third search space configuration, and wherein a third number of PDCCH monitoring candidates is determinable based on at least one parameter of the third search space configuration, the method further comprising:

transmitting, when the first serving cell is activated, the third number of PDCCH monitoring candidates on slots of the second serving cell for DCI formats with PDSCH resource assignments and/or PUSCH grants for the second serving cell.

23. A communication device for monitoring a physical downlink control channel, PDCCH, for enhanced cross carrier scheduling, the communication device comprising:

processing circuitry; and memory coupled to the processing circuitry and having instructions stored therein that are executable by the processing circuitry to cause the communication device to perform operations comprising:

receive a radio resource control, RRC, layer message configuring cross carrier scheduling from a first serving cell configured for the communication device to a second serving cell;

receive a plurality of search space configurations as part of a RRC layer configuration for the second serving cell, the plurality of search space configurations including a first search space configuration and a second search space configuration;

responsive to receiving the RRC layer message, monitor, while the first serving cell is activated, a first number of PDCCH monitoring candidates on slots of the first serving cell for downlink control information, DCI, formats with physical downlink shared channel, PDSCH, resource assignments and/or physical uplink shared channel, PUSCH, grants for the second serving cell, wherein the first number of PDCCH monitoring candidates are determined by the communication device based on at least one parameter of the first search space configuration; and responsive to receiving a command:

cease to monitor the first number of PDCCH monitoring candidates on slots of the first serving cell, and monitor a second number of PDCCH monitoring candidates on slots of the second serving cell for DCI formats with PDSCH resource assignments and/or PUSCH grants for the second serving cell, wherein the second number of PDCCH monitoring candidates are determined by the communication device based on at least one parameter of the second search space configuration.

24. A network node operating in a communications network with a communication device monitoring a physical downlink control channel, PDCCH, for enhanced cross carrier scheduling, the network node comprising:

processing circuitry; and memory coupled to the processing circuitry and having instructions stored therein that are executable by the processing circuitry to cause the network node to perform operations comprising:

transmit a radio resource control, RRC, layer message configuring cross-carrier scheduling from a first serving cell configured for the communication device to a second serving cell;

transmit a plurality of search space configurations as part of a RRC layer configuration for the second serving cell, the plurality of search space configurations including a first search space configuration and a second search space configuration;

responsive to transmitting the RRC layer message, transmit, while the first serving cell is activated, a first number of PDCCH monitoring candidates on slots of the first serving cell for downlink control information, DCI, formats with physical downlink shared channel, PDSCH, resource assignments and/or physical uplink shared channel, PUSCH, grants for the second serving cell, wherein the first number of PDCCH monitoring candidates is determinable based on at least one parameter of the first search space configuration;

transmit a command to the communication device, the command including an indication that the communication device cease monitoring the PDCCH monitoring candidates on slots of the first serving cell; and transmit a second number of PDCCH monitoring candidates on slots of the second serving cell for DCI formats with PDSCH resource assignments and/or PUSCH grants for the second serving cell, wherein the second number of PDCCH monitoring candidates is determinable based on at least one parameter of the second search space configuration.

* * * * *